(12) United States Patent
Burns et al.

(10) Patent No.: US 10,438,273 B2
(45) Date of Patent: Oct. 8, 2019

(54) METHODS, APPARATUSES, AND SYSTEMS FOR ONLINE ITEM LOOKUP OPERATIONS

(71) Applicant: Home Depot Product Authority, LLC, Atlanta, GA (US)

(72) Inventors: Karen Burns, Atlanta, GA (US); Troy Gerstenberger, Atlanta, GA (US); Brenda L. Peregoy, Atlanta, GA (US); Jessica R. Saak, Atlanta, GA (US); Jesse Thompson, Atlanta, GA (US)

(73) Assignee: Home Depot Product Authority, LLC, Atlanta, GA (US)

(*) Notice: Subject to any disclaimer, the term of this patent is extended or adjusted under 35 U.S.C. 154(b) by 580 days.

(21) Appl. No.: 14/726,034

(22) Filed: May 29, 2015

(65) Prior Publication Data
US 2016/0350836 A1 Dec. 1, 2016

(51) Int. Cl.
*G06Q 30/00* (2012.01)
*G06Q 30/06* (2012.01)

(52) U.S. Cl.
CPC ..... *G06Q 30/0633* (2013.01); *G06Q 30/0625* (2013.01)

(58) Field of Classification Search
CPC .......... G06Q 30/0625; G06Q 30/0633; G06Q 20/342; G06K 15/00
USPC ................................................. 705/16, 26.62
See application file for complete search history.

(56) References Cited

U.S. PATENT DOCUMENTS

| | | |
|---|---|---|
| 7,168,525 B1 | 1/2007 | Jacobs |
| 7,845,544 B2 | 12/2010 | Jacobs |
| 8,577,753 B1 | 11/2013 | Vincent et al. |
| 8,577,879 B1 | 11/2013 | Hotchkies et al. |
| 8,620,767 B2 | 12/2013 | Linden et al. |
| 8,635,113 B2 | 1/2014 | Borders et al. |
| 8,732,024 B2 | 5/2014 | Jacobs |
| 2004/0181454 A1 | 9/2004 | Manno |
| 2005/0160014 A1 | 7/2005 | Moss et al. |
| 2006/0138219 A1* | 6/2006 | Brzezniak ............ G06Q 20/32 235/383 |
| 2007/0088624 A1 | 4/2007 | Vaughn et al. |
| 2007/0136140 A1* | 6/2007 | Smith, Jr. ............ G06Q 30/06 705/80 |
| 2007/0150369 A1* | 6/2007 | Zivin ................ G06Q 30/02 705/26.64 |
| 2009/0265251 A1 | 10/2009 | Dunlap et al. |
| 2011/0161354 A1 | 6/2011 | Ma |
| 2011/0251892 A1* | 10/2011 | Laracey ............ G06Q 30/0253 705/14.51 |
| 2012/0191522 A1 | 7/2012 | McLaughlin et al. |
| 2013/0013390 A1 | 1/2013 | Paulson-Ellis et al. |
| 2013/0282522 A1 | 10/2013 | Hassan |
| 2013/0297435 A1 | 11/2013 | Prellwitz et al. |
| 2013/0325656 A1 | 12/2013 | Ouimet |

* cited by examiner

*Primary Examiner* — Rokib Masud
(74) *Attorney, Agent, or Firm* — Greenberg Traurig, LLP

(57) ABSTRACT

Methods, apparatuses, and implementations of an online item searching platform having a store-to-store interface are disclosed. At least some versions of the disclosed systems enable a user to perform purchase and pickup transactions for items across multiple remote stores. The disclosed systems may enable a user to separately navigate hierarchical menus, perform text searches, and navigate favorites bars to find and select items for purchase.

15 Claims, 20 Drawing Sheets

METHODS, APPARATUSES, AND SYSTEMS FOR ONLINE ITEM LOOKUP OPERATIONS

BACKGROUND

1. Field of the Invention

This disclosure relates generally to methods and apparatuses that can be used to conduct an online item search operation having a store-to-store interface.

2. Description of Related Art

Prior embodiments of online item search applications may result in delays and errors during a check-out process. Moreover, prior embodiments of online item search capabilities may not have a capability to provide remote store information. This may limit the scope of the online item search to a single store, resulting in inefficiency for the customer and a possible loss of business to a competitor.

SUMMARY

This disclosure includes embodiments of methods, apparatuses, and systems for online item lookup operations. In some embodiments, the online item lookup can be used by a store employee or cashier to find specific items in inventory for a customer to purchase. This functionality may be especially useful for items that do not have scannable bar codes. Examples of such items may include loose items, such as nuts and bolts. The cashier may access the online item lookup by using a user interface on a hardware device, such as a computer terminal, cash register, or mobile device. In some embodiments, the online item lookup operations are executed by at least one processor included in the hardware device. In some embodiments, the user interface may display a hierarchical menu having selectable icons. The cashier may select an icon to drill down to another hierarchical menu level. In some embodiments, as the cashier progresses through the menu levels, the cashier may eventually access an item page corresponding to the item being searched.

In some embodiments, the user interface has a favorites bar having various selectable item icons. The favorites bar may show an ordered list of the most popular items sold over a period of time. In some embodiments, the favorites bar corresponds to the hierarchy level currently accessed by the cashier. The cashier may select one or more of the item icon in the favorites bar to navigate to a particular item. In some embodiments, this functionality is separate from a text search or a selection from the hierarchical menus. As the cashier moves through the menu levels, the favorites bar may be correspondingly modified. When the cashier reaches the desired item page, the favorites bar may disappear. In some embodiments, the favorites bar may be updated at predetermined time intervals to ensure that the items displayed are current with seasonal items, on-sale items, or the like.

In some embodiments, an item page may display a list of remote stores that have the item currently in stock. The list of remote stores may be a default list determined by predetermined criteria. In some embodiments, the cashier may be able to modify the list of remote stores by searching by store number or zip code. The cashier may order items from one or more remote stores and reserve them for customer pickup at the respective remote stores. The cashier may complete the purchase of all items, including those from remote stores, in a single purchase transaction at the current store.

In some embodiments, a method for implementing an online inventory application may comprise initiating a session of an online inventory application by accessing a user interface running or stored on a hardware device comprising at least one processor. In some embodiments, the method further comprises accessing a category hierarchical menu on the user interface comprising a search field, a popular items list, and a category list comprising a plurality of item categories. In some embodiments, the method further comprises making a selection from the category hierarchical menu and accessing a sub-category hierarchical menu on the user interface comprising a search field, a sub-category popular items list comprising items related to the selection from the category hierarchical menu, and a sub-category list comprising a plurality of item sub-categories. In some embodiments, the method further comprises making a selection from the sub-category hierarchical menu and performing a menu transaction on the user interface.

In some embodiments, performing the menu transaction comprises accessing one or more additional hierarchical menus and making a selection from the one or more additional hierarchical menus. In other embodiments, performing the menu transaction comprises accessing an item page on the user interface and selecting a functional field. In some embodiments, the item page comprises one or more of one or more functional fields and one or more informational fields displaying information.

In some embodiments, selecting the functional field comprises accessing a store interface on the user interface, inputting a quantity of an item related to the item page for purchase, and completing a purchase transaction of the item for a customer. In some embodiments, the store interface is configured to access item information from a current store and a plurality of remote stores.

In some embodiments, completing the purchase transaction comprises designating the item for pickup at the current store. In other embodiments, completing the purchase transaction comprises designating the item for pickup at a remote store. In other embodiments, completing the purchase transaction comprises selecting a remote item from a remote store on the remote store inventory list on the user interface, completing a purchase transaction of the remote item, and designating the remote item for pickup at the remote store. In some embodiments, completing the purchase transaction comprises applying a gift card balance to a purchase of the item. In other embodiments, completing the purchase transaction comprises applying a store credit to a purchase of the item.

In some embodiments, accessing the store interface further comprises conducting a search of the remote stores. In some embodiments, the search comprises one or more of a zip code search and a store number search.

In some embodiments, the popular items list comprises a list of most-sold items over a plurality of categories over a period of time. In some embodiments, the sub-category popular items list comprises a list of most-sold items in a sub-category over a period of time. In some embodiments, the popular items list and the sub-category popular items list are unique to a transaction register location. In some embodiments, the popular items list and the sub-category popular items list are updated at set time intervals.

In some embodiments, the making the selection from the category hierarchical menu comprises one or more of performing a text search in the search field; selecting an item from the popular items list; and selecting a category from the category list. In some embodiments, the popular items list is separately navigable from the search field and the category list.

In some embodiments, a method for implementing an online inventory application may comprise accessing a store interface running or stored on a hardware device comprising at least one processor. In some embodiments, the store interface is configured to access item information from a current store and a plurality of remote stores. In some embodiments, the method further comprises inputting a quantity of an item related to the item page for purchase on the user interface and completing a purchase transaction of the item for a customer on the user interface.

In some embodiments, completing the purchase transaction comprises designating the item for pickup at the current store. In other embodiments, completing the purchase transaction comprises designating the item for pickup at a remote store. In other embodiments, the completing the purchase transaction comprises: selecting a remote item from a remote store on the remote store inventory list on the user interface; completing a purchase transaction of the remote item; and designating the remote item for pickup at the remote store. In some embodiments, completing the purchase transaction comprises applying a gift card balance to a purchase of the item. In other embodiments, completing the purchase transaction comprises applying a store credit to a purchase of the item.

In some embodiments, the accessing the store interface further comprises conducting a search of the remote stores. In some embodiments, the search comprises one or more of a zip code search and a store number search.

In some embodiments, a non-transitory computer readable medium may store a program comprising instructions executable by a machine to, at least, initiate a session of an online inventory application by accessing a user interface running or stored on a hardware device comprising at least one processor, and access a category hierarchical menu on the user interface comprising a search field, a popular items list, and a category list comprising a plurality of item categories. In some embodiments, the instructions are further executable to make a selection from the category hierarchical menu, access a sub-category hierarchical menu on the user interface comprising a search field, a sub-category popular items list comprising items related to the selection from the category hierarchical menu, and a sub-category list comprising a plurality of item sub-categories. In some embodiments, the instructions are further executable to make a selection from the sub-category hierarchical menu and perform a menu transaction on the user interface.

In some embodiments, the instructions executable by a machine to perform the menu transaction comprise instructions executable by a machine to access one or more additional hierarchical menus and make a selection from the one or more additional hierarchical menus. In other embodiments, the instructions executable by a machine to perform the menu transaction comprise instructions executable by a machine to access an item page on the user interface comprising one or more of one or more functional fields and one or more informational fields displaying information, and selecting a functional field.

In some embodiments, the instructions executable by a machine to select the functional field comprise instructions executable by a machine to access a store interface on the user interface and complete a purchase transaction of the item for a customer. In some embodiments, the store interface is configured to access item information from a current store and a plurality of remote stores and input a quantity of an item related to the item page for purchase.

In some embodiments, the instructions executable by a machine to complete the purchase transaction comprise instructions executable by a machine to designate the item for pickup at the current store. In other embodiments, the instructions executable by a machine to complete the purchase transaction comprise instructions executable by a machine to designate the item for pickup at a remote store. In other embodiments, the instructions executable by a machine to complete the purchase transaction comprise instructions executable by a machine to select a remote item from a remote store on the remote store inventory list on the user interface, complete a purchase transaction of the remote item, and designate the remote item for pickup at the remote store. In some embodiments, the instructions executable by a machine to complete the purchase transaction comprise instructions executable by a machine to apply a gift card balance to a purchase of the item. In other embodiments, the instructions executable by a machine to complete the purchase transaction comprise instructions executable by a machine to apply a store credit to a purchase of the item.

In some embodiments, the instructions executable by a machine to access the store interface further comprise instructions executable by a machine to conduct a search of the remote stores. In some embodiments, the instructions executable by a machine to conduct the search comprise conducting one or more of a zip code search and a store number search.

In some embodiments, the popular items list comprises a list of most-sold items over a plurality of categories over a period of time. In some embodiments, the sub-category popular items list comprises a list of most-sold items in a sub-category over a period of time. In some embodiments, the popular items list and the sub-category popular items list are unique to a transaction register location. In some embodiments, the popular items list and the sub-category popular items list are updated at set time intervals.

In some embodiments, the instructions executable by a machine to make the selection comprise one or more of performing a text search in the search field, selecting an item from the popular items list, and selecting a category from the category list. In some embodiments, the popular items list is separately navigable from the search field and the category list.

In some embodiments, a computing device for implementing an online inventory application may comprise at least one processor; a memory device; and a display device configured to display a graphical user interface (GUI) comprising one or more graphical elements configured to implement, using the at least one processor, one or more software applications stored on one or more servers. In some embodiments, the one or more software applications are configured to initiate a session of an online inventory application by accessing a user interface running or stored on a hardware device comprising at least one processor and access a category hierarchical menu on the user interface. In some embodiments, the category hierarchical menu comprises a search field; a popular items list; and a category list comprising a plurality of item categories. In some embodiments, the software applications are further configured to make a selection from the category hierarchical menu, access a sub-category hierarchical menu on the user interface comprising a search field, a sub-category popular items list comprising items related to the selection from the category hierarchical menu, and a sub-category list comprising a plurality of item sub-categories. In some embodiments, the one or more software applications are configured to make a selection from the sub-category hierarchical menu and perform a menu transaction on the user interface.

The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, or a component of a system, that "comprises," "has," "includes" or "contains" one or more elements or features possesses those one or more elements or features, but is not limited to possessing only those elements or features. Likewise, a method that "comprises," "has," "includes" or "contains" one or more steps possesses those one or more steps, but is not limited to possessing only those one or more steps. Additionally, terms such as "first" and "second" are used only to differentiate structures or features, and not to limit the different structures or features to a particular order.

Any embodiment of any of the disclosed methods, systems, or system components can consist of or consist essentially of—rather than comprise/include/contain/have—any of the described elements and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

The foregoing has outlined rather broadly certain features and technical advantages of embodiments of the present invention in order that the detailed description that follows may be better understood. Additional features and advantages will be described below. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION OF ILLUSTRATIVE EMBODIMENTS

Figure 1A:
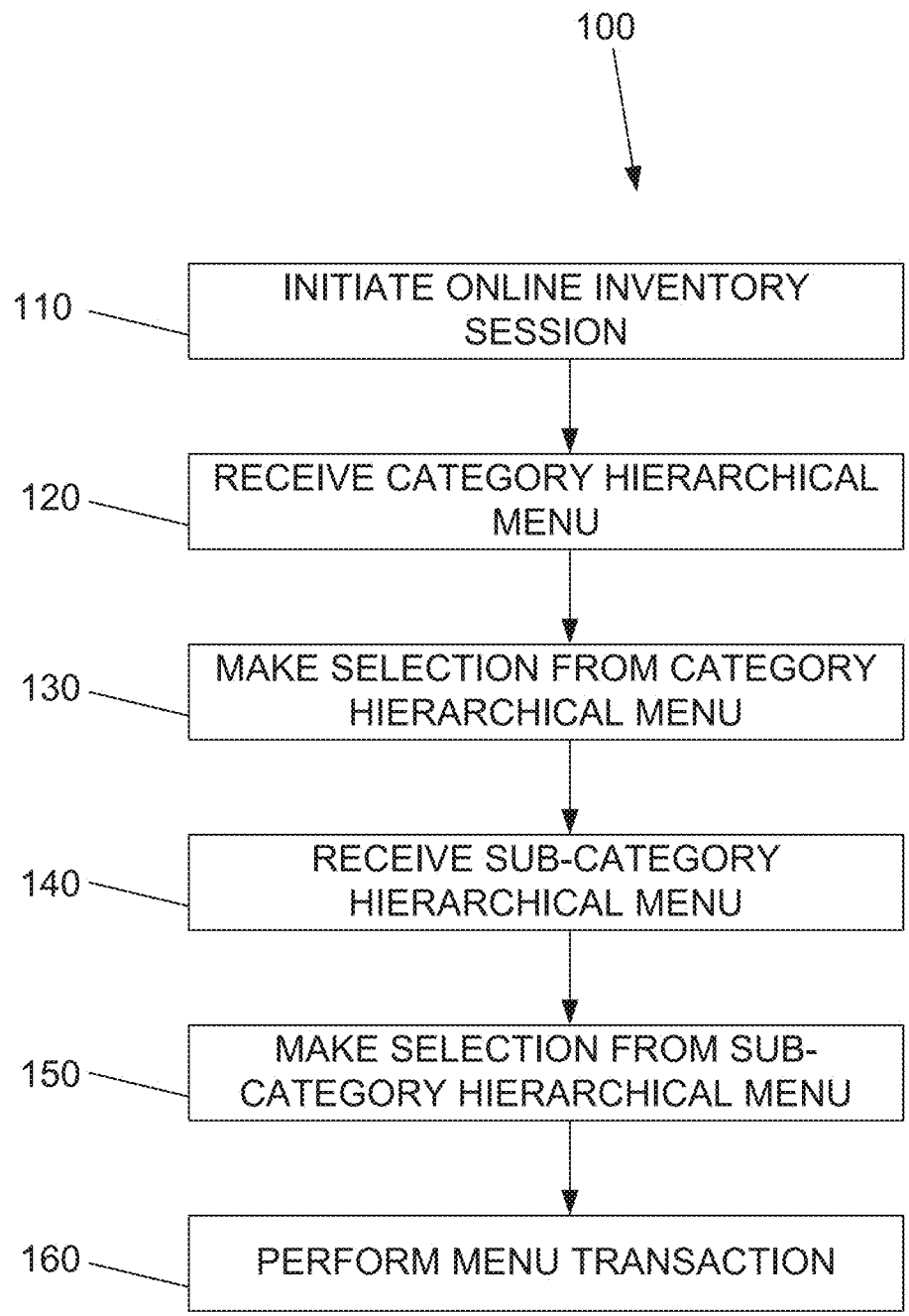
FIG. 1A depicts an embodiment of an online inventory method.

Referring now to the drawings, FIG. 1A illustrates an online inventory method 100 according to an embodiment of the disclosure. In the embodiment shown, a user, who may be an employee or agent of a retail store (e.g., an associate, and, more specifically, a retail store associate), may begin method 100 at step 110 by initiating an online inventory session.

The user may be located outside of a store in which she otherwise works during all or part of step 110, and the user may be prompted by a customer to initiate an online inventory session when one or both of the user and the customer are located outside of the store in which the user otherwise works. In this case, the user may conduct the online inventory session on a mobile device. If one or both of the user and the customer are located in a store where the user otherwise works at the time the customer prompts the user to initiate an online inventory session during all or part of step 110, the user may initiate the online inventory session by accessing a hardware device. The hardware device may be a computer register or terminal inside a store. The hardware device may also be a mobile device located inside or outside the store. The hardware device may be configured to access one or more software applications that perform online inventory functionalities.

Figure 1B:
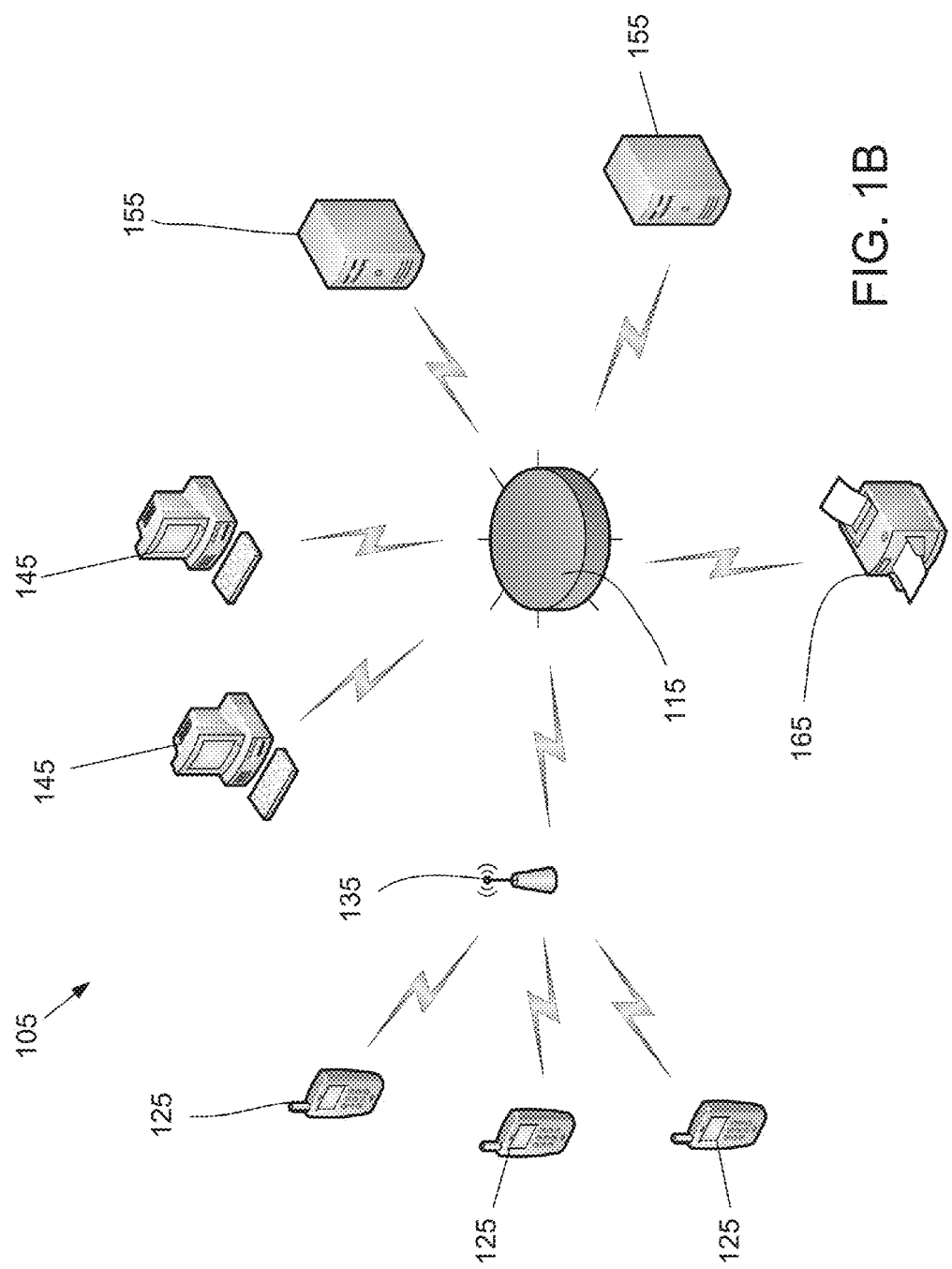
FIG. 1B depicts an exemplary network structure of an embodiment of a mobile returns system.

FIG. 1B illustrates one embodiment of a network system 105 by which a user may access the online inventory system. In some embodiments, system 105 comprises a network hub 115, one or more mobile devices 125, one or more wireless hubs 135, one or more computing devices or registers 145, one or more servers 155, and one or more output devices 165. System 105 may comprise more or less mobile devices, wireless hubs, computing devices, printing devices, and servers than shown in FIG. 1B. Computing devices 145, servers 155, and output device 165 may be connected to network hub 115 via wired or wireless protocols.

Servers 155 may store a plurality of software applications. Mobile devices 125, computing devices 145, and output device 165 may access the software applications stored on servers 155 via network hub 115. In some embodiments, mobile devices 125 and computing devices 145 store a plurality of software applications in a local memory device. In some embodiments, the one or more software applications accessed by the user may be stored locally on a mobile device 125 or computing device 145 or in one or more servers 155.

The user may access an interface on the mobile device and/or computer register to perform functionalities of the software application. The software application may look up items in the inventory of the current store or one or more remote stores. The software application may also perform functions such as price lookup, item pickup scheduling, and remote store item purchasing.

In the embodiment shown in FIG. 1A, the user may receive at step 120 a hierarchical menu at the mobile device and/or computer register. The hierarchical menu may contain one or more icons for selection by the user. The icons may represent different categories of goods available for sale in the relevant store. The categories may be arranged by store departments. Further, the hierarchical menu may contain a search field for performing a text or item number search. In the embodiment shown, the user may continue method 100 at step 130 by making a selection from the hierarchical menu. The user may make a selection by entering search terms into the search field. The user may also make a selection by selecting an icon from the hierarchical menu. The user may manually enter information or select information from the hierarchical menu via a keyboard, mouse, touchscreen or touchpad, or in any other suitable manner. The user may perform these operations when an item does not have a scanning code. For certain functionalities, the user may make a selection by scanning item information. For example, the user may scan a code (e.g., a bar code) on the item using a scanning device that is a part of or that is coupled to the mobile device and/or computer register.

In the embodiment shown, the user may receive at step 140 a sub-hierarchical menu at the mobile device and/or computer register based on the selection made in the first hierarchical menu. The sub-hierarchical menu may also contain one or more icons for selection by the user. Further, the sub-hierarchical menu may contain a search field for performing a text or item number search. The icons may represent different sub-categories of goods available for sale. The sub-categories displayed in the sub-hierarchical menu may be based on the selection made by the user in the hierarchical menu. In the embodiment shown, the user may continue method 100 at step 150 by making a selection from the sub-hierarchical menu. The user may make a selection by entering search terms into the search field. The user may also make a selection by selecting an icon from the sub-hierarchical menu.

In the embodiment shown, the user may complete method 100 at step 160 by performing a menu transaction. For example, the user may access additional sub-hierarchical menus and make selections from the additional menus. The user may also access an item page. The item page may correspond to item information entered by the user into the search field or scanned by a user. The item page may also correspond to an item selected by the user using selections from the hierarchical menus. The user may view item information from the item page to provide to a customer. The user may also select additional functionalities from the item page. For example, the user may ring up a sale of the item from the relevant (e.g., current) store. The user may also access a remote store interface to view item inventory or conduct a purchase transaction at one or more remote stores. An example method is described in FIG. 2.

Figure 2:
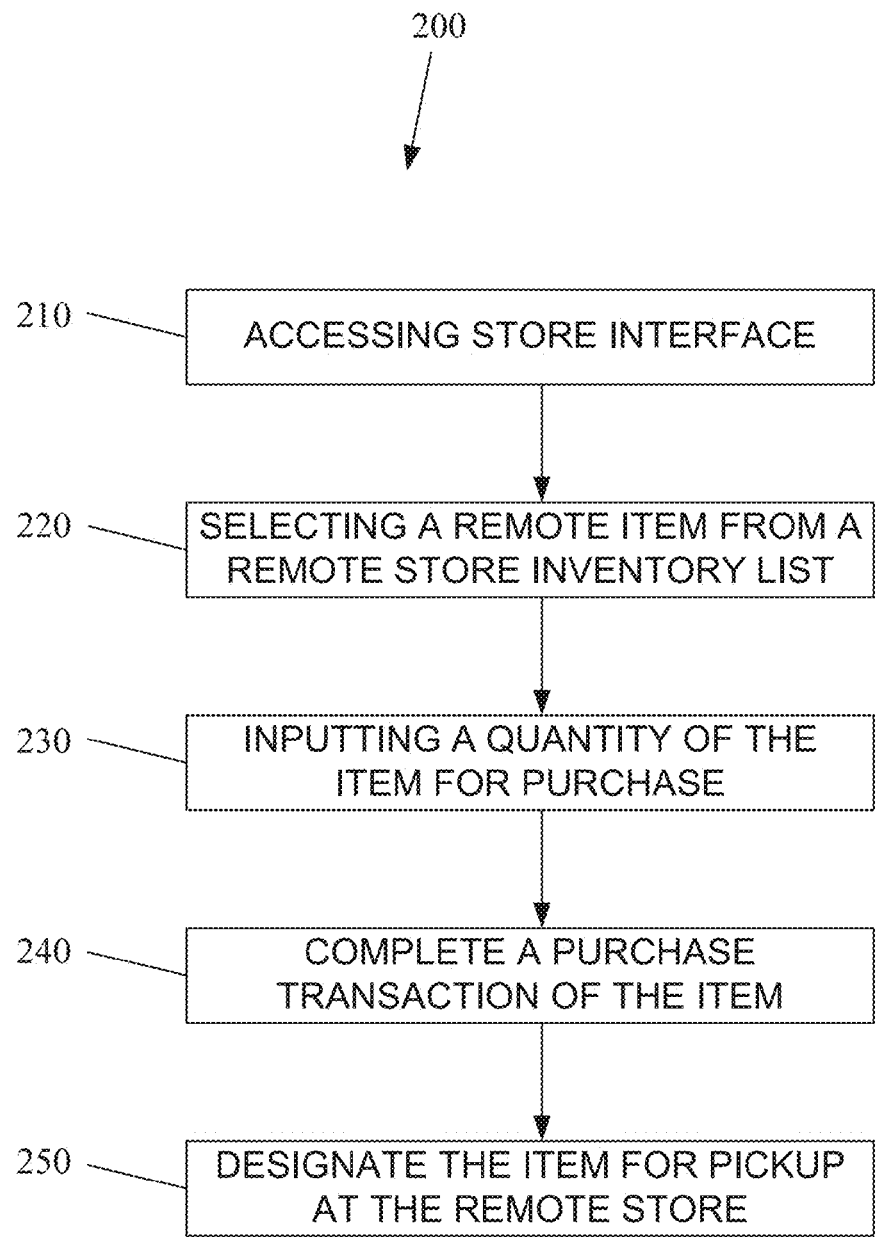
FIG. 2 depicts an embodiment of a remote purchasing method.

FIG. 2 illustrates a remote store interface method 200 according to an embodiment of the disclosure. In the embodiment shown, a user may begin method 200 at step 210 by accessing a store interface on the mobile device and/or computer register. The user may access the store interface from an item page. In the embodiment shown, the user may view a number of items available in inventory at the current store and each of a group of one or more remote stores. The group of remote stores may be a default list of remote stores. Additionally, the user may input search information to create a customized list of one or more remote stores.

In the embodiment shown, the user may continue method 200 at step 220 by selecting an item from a remote store inventory list. In this step, the user may have the option to select the same item from the inventory list of multiple remote stores. The user may continue method 200 at step 230 by inputting a quantity of the item for purchase. The user may enter a quantity of the item to be bought from a remote store. The user may enter item quantities for multiple remote stores. The quantity may be equal or less than the item inventory at a particular remote store. The user may order the quantities desired by the customer from the remote stores desired by the customer. The user may create an online shopping cart including all item quantities.

In the embodiment shown, the user may continue method 200 at step 240 by completing a purchase transaction of the selected item. In this step, the user may ring up the item quantities in the online shopping cart for purchase by the customer. The customer may purchase all item quantities in a single purchase transaction made at the current store. In the embodiment shown, the user may complete method 200 at step 250 by designating the purchased items for pickup at their respective remote store locations.

FIGS. 3A-14B show examples of a graphical user interface (GUI) that may be displayed on a mobile computer and/or computer register. The GUI may be used by a user to implement one or more software applications to perform one or more of methods 100 and 200. The GUI may be implemented using a suitable operating platform, such as Windows, Android, and Apple iOS.

Figure 3A:
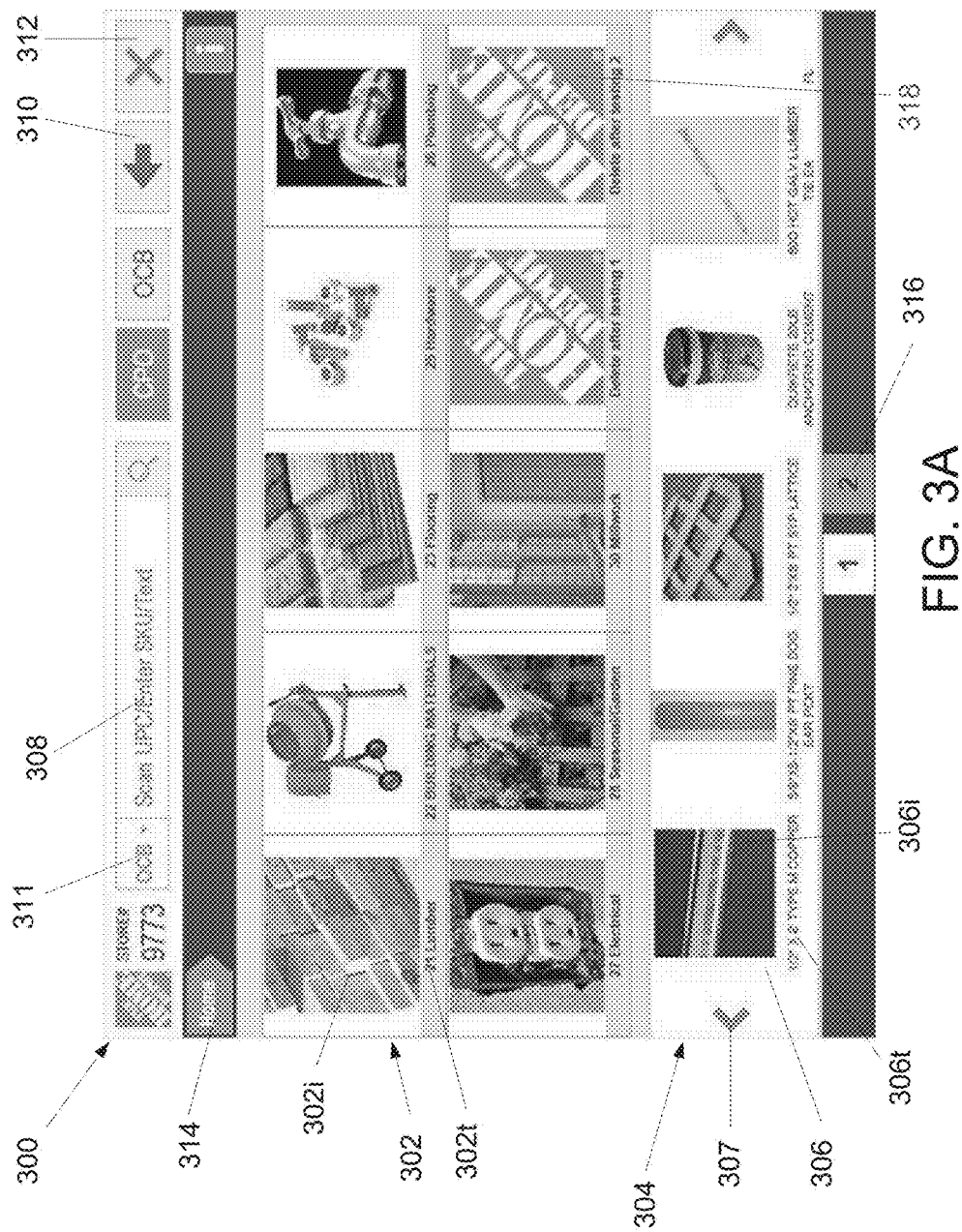
FIG. 3A depicts a category hierarchical interface according to an embodiment of the online inventory system.

FIG. 3A shows an online inventory interface 300. Online inventory interface 300 may comprise one or more functionalities. Exemplary functionalities may include an online cashier book interface (OCB), an all-item search interface (ALL), a price inquiry interface (INQ), and a customer purchase order interface (CPO). Exemplary interfaces are illustrated in FIGS. 3A-12D. In FIG. 3A, online inventory interface 300 comprises a hierarchical menu. In the embodiment shown, a top level of the menu may show a list of various department icons 302. In some embodiments, the top level of the menu may also show a promotions icon. Each icon may include textual indicia 302t, which may include any suitable combinations of letters, numbers, and/or symbols that describe or otherwise are associated with the department, and an image 302i, which may depict an example product or service associated with the department. The functionality triggered by a user selection of a particular department icon 302 may drill down to a list of corresponding categories. The functionality triggered by selecting a particular category may drill down to a list of corresponding sub-categories. Additional levels of sub-category lists may also be implemented. The functionality triggered by selecting a particular sub-category in the last sub-category list of a given path may transition to a list of corresponding items. The functionality triggered by the clicking on an item may enable a user to access an item detail page. The item detail page may show a picture of the item, an item name, an item identification number, and an item price. The functionality accessible via the item detail page may allow a user to add a quantity of the item to a customer's order.

In the embodiment shown, online inventory interface 300 includes favorites bar 304 and scroll arrows 307. Favorites bar 304 may show an ordered list of most popular items icons 306 sold over a certain period of time. Each item icon may include textual indicia 306t, which may include any suitable combinations of letters, numbers, and/or symbols that describe or otherwise are associated with the item, and an image 306i, which may depict the popular product or service. The functionality triggered by selecting an icon in favorites bar 304 may enable a user to access an item page for that item. In the embodiment shown, items are designated "most popular" over the certain period time based on sales figures. Sales data may be updated periodically (e.g., daily, weekly, a specified number of days). In turn, favorites bar 304 may be updated accordingly.

In the embodiment shown, favorites bar 304 is applicable to the level of the hierarchy shown. For example, in the embodiment shown, online inventory interface 300 displays a top level hierarchical menu showing a list of departments. In the embodiment shown, favorites bar 304 shows the most popular items sold over a certain period time across all departments. In the embodiment shown, favorites bar 304 is also unique to a particular computer register used to access online inventory interface 300. For example, a register in a garden department of a store may display a favorites bar different from one displayed on a register in a plumbing department. The functionality triggered by selecting scroll arrows 307 may be used to scroll through the favorites bar 304 in both forward and backward directions to display additional item icons 306.

In the embodiment shown, as a user proceeds through additional levels in the hierarchical menu, favorites bar 304 will be correspondingly updated and narrowed. In the embodiment shown, when the user navigates to the end of the hierarchy, favorites bar 304 will disappear and a list of all corresponding items will be displayed on the page.

In the embodiment shown, online inventory interface 300 includes a text search field 308. A text search may be user-configurable to search all in-store items or a subset of items. For example, an all-item search may be performed by selecting pull-down button 311 and choosing the applicable functionality (ALL). An all-item search interface is further illustrated in FIG. 3B. The functionality triggered by selecting pull-down button 311 may be used to navigate between different functionalities of online inventory interface 300, such as the OCB, ALL, and CPO interfaces. In the embodiment shown, online inventory interface 300 includes Back button 310, Cancel button 312, one or more breadcrumb tabs 314, and one or more scroll buttons 316. The functionality triggered by selecting Back button 310 may be used to return to a previous screen. The functionality triggered by selecting Cancel button 312 may be used to cancel a previous selection. The functionality triggered by selecting a breadcrumb tab 314 may enable the user to track the user's progress through the hierarchical levels of online inventory interface 300. As the user moves through the hierarchical levels, the functionality triggered by selecting one or more of breadcrumb tabs 314 may take the user to other hierarchical levels. The functionality of these buttons may be the same or substantially similar to the embodiments disclosed in FIGS. 4-10. The functionality triggered by selecting one of the scroll buttons 316 may be used to toggle back and forth between multiple pages of department icons 302.

Figure 3B:
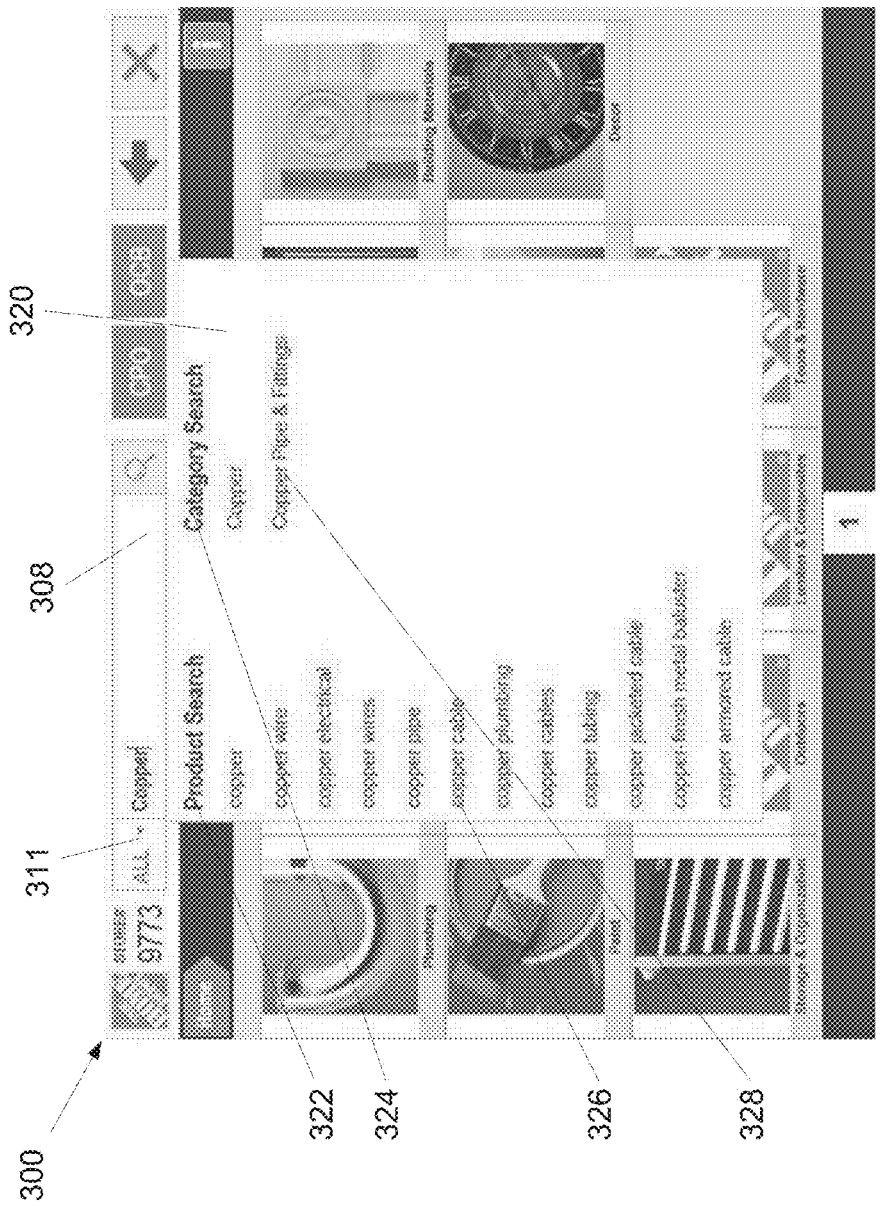
FIG. 3B depicts an all-search interface according to an embodiment of the online inventory system

FIG. 3B shows another embodiment of online inventory interface 300. The embodiment shown in FIG. 3B may be displayed when a user clicks pull-down button 311 and chooses an all-search functionality (ALL). In the embodiment shown, a user may enter search terms into text search field 308. When a user enters a search term, a drop-down window 320 may be displayed containing one or more auto-completed searches. The auto-completed search results may be displayed by product search 322 and by category search 324. The user may then select a particular product 326 or category 328. In these embodiments, drop-down window 320 may be displayed without completing the full term in the text search. In the embodiments shown, each of the hierarchical menus, favorites bar 304, and text search field 308 may have separate navigable interfaces.

Figure 4:
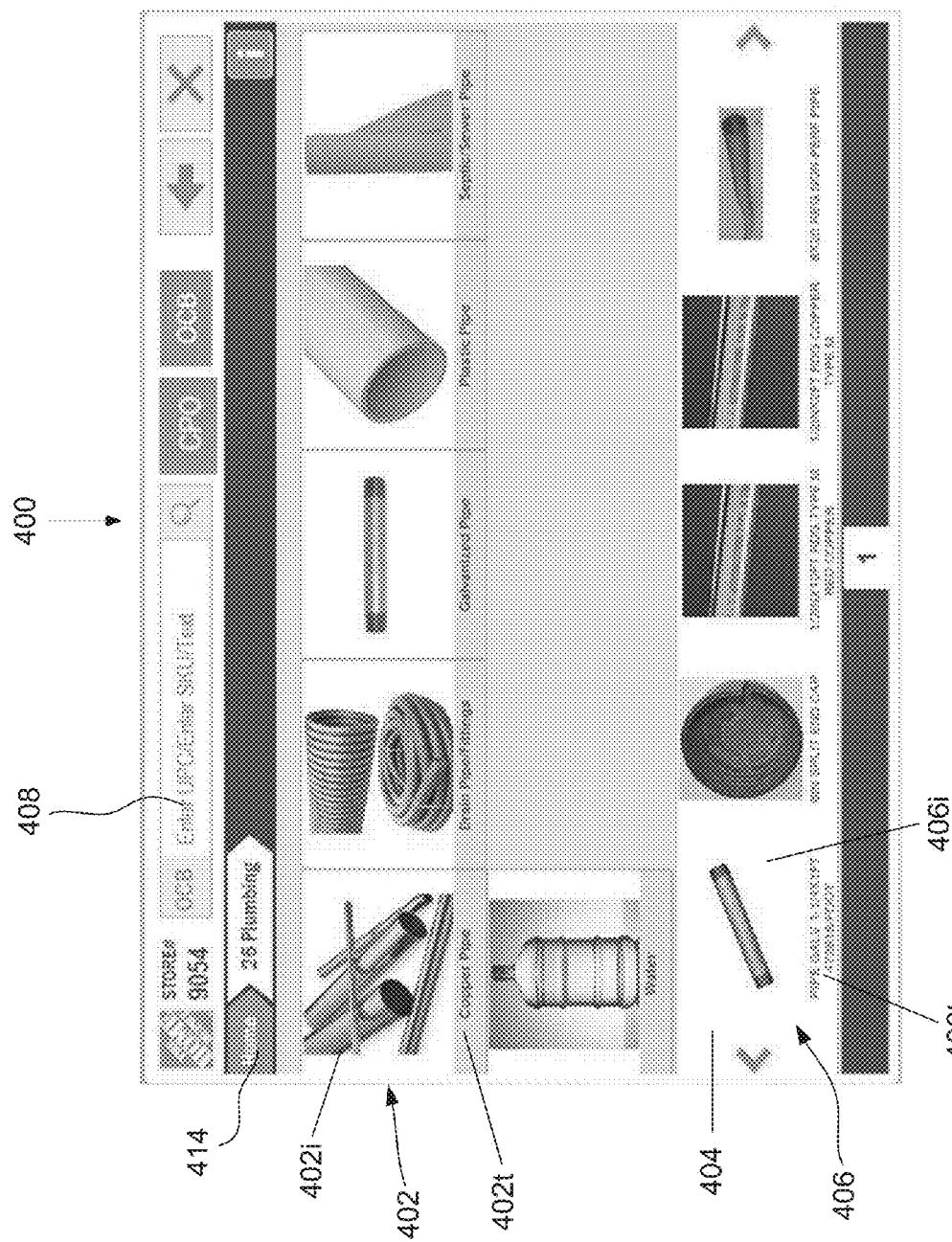
FIG. 4 depicts a sub-category hierarchical interface displayable during an embodiment of the online inventory system.

FIG. 4 shows a sub-category hierarchical interface 400, which is displayed when a user selects a department icon 302 from the menu shown in FIG. 3A or a category search term 328 from the drop-down window 320 shown in FIG. 3B. In the embodiment shown in FIG. 4, a user selected a plumbing icon from the menu in FIG. 3A. In the embodiment shown, the functionality triggered by selecting the plumbing icon may display a plumbing menu having icons 402 denoting certain categories of plumbing items. Each icon may include textual indicia 402t, which may include any suitable combinations of letters, numbers, and/or symbols that describe or otherwise are associated with the department, and an image 402i, which may depict an example product or service associated with the department.

In the embodiment shown, sub-category hierarchical interface 400 includes favorites bar 404. In the embodiment shown, favorites bar 404 is substantially similar in appearance to favorites bar 304 in FIG. 3A. However, as discussed previously with respect to favorites bar 304, favorites bar 404 may be updated to reflect different hierarchical levels. For example, favorites bar 404 may include icons 406 corresponding to the most popular items sold over a certain time across all plumbing categories for the particular register used. Each item icon may include textual indicia 406t, which may include any suitable combinations of letters, numbers, and/or symbols that describe or otherwise are associated with the item, and an image 406i, which may depict the popular product or service. The functionality triggered by selecting an icon in favorites bar 304 may enable a user to access an item page for that item. In the embodiment shown, the scope of favorites bar 404 is narrower than the scope of favorites bar 304.

In the embodiment shown, sub-category hierarchical interface 400 includes a text search field 408. As discussed previously with respect to text search field 308, a user may perform a text search via text search field 408 independently of the hierarchical menu and favorites bar 404. Therefore, a user may conduct a search at any time and at any level of the hierarchical menu.

Figure 5:
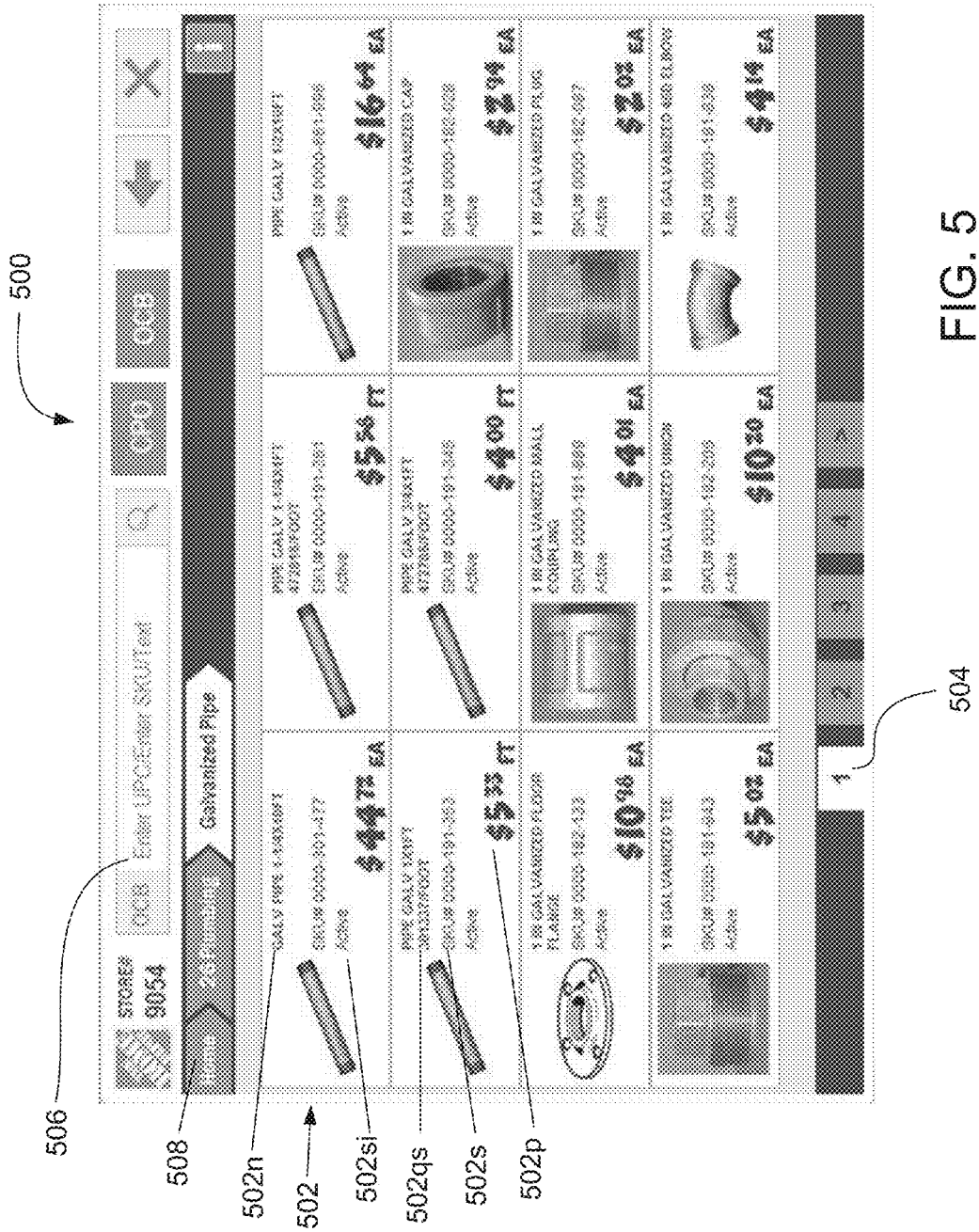
FIG. 5 depicts an item hierarchical interface displayable during an embodiment of the online inventory system.

FIG. 5 shows an item hierarchical interface 500, which is displayed when a user selects a menu icon 402 from the menu shown in FIG. 4. In the example embodiment shown in FIG. 5, a user selected a galvanized pipe icon from the menu in FIG. 4. In the embodiment shown, the functionality triggered by selecting the galvanized pipe icon may display an item menu having icons 502 denoting certain categories of galvanized pipe. Item icons 502 may include item description information, which may include one or more of a name 502n (e.g., an abbreviated name) for the item, quantity and size information 502qs for the item, stock keeping unit (SKU) designation 502s for the item, and status information 502si (e.g., active, out-of-stock, discontinued, on back order, or the like) for the item. Item icons 502 may also include item pricing information 502p, such as a value associated with an instance of the item (e.g., $44.72 each) or a value associated with a certain amount of the item (e.g., $5.58 per foot).

In the embodiment shown, item hierarchical interface 500 does not include a favorites bar. In alternate embodiments, a favorites bar may be included comprising one or more icons corresponding to the most popular items sold in the menu category. In this example, a favorites bar would show the most popular items sold in the galvanized pipe category. This example illustrates that a favorites bar may not be provided at a hierarchical level immediately before an item page.

In the embodiment shown, item hierarchical interface 500 includes scroll buttons 504. Scroll buttons 504 may allow user to scroll between multiple pages of item icons 502. In the embodiment shown, item hierarchical interface 500 includes a text search field 506 that provides the same functionality as text search field 406.

Figure 6:
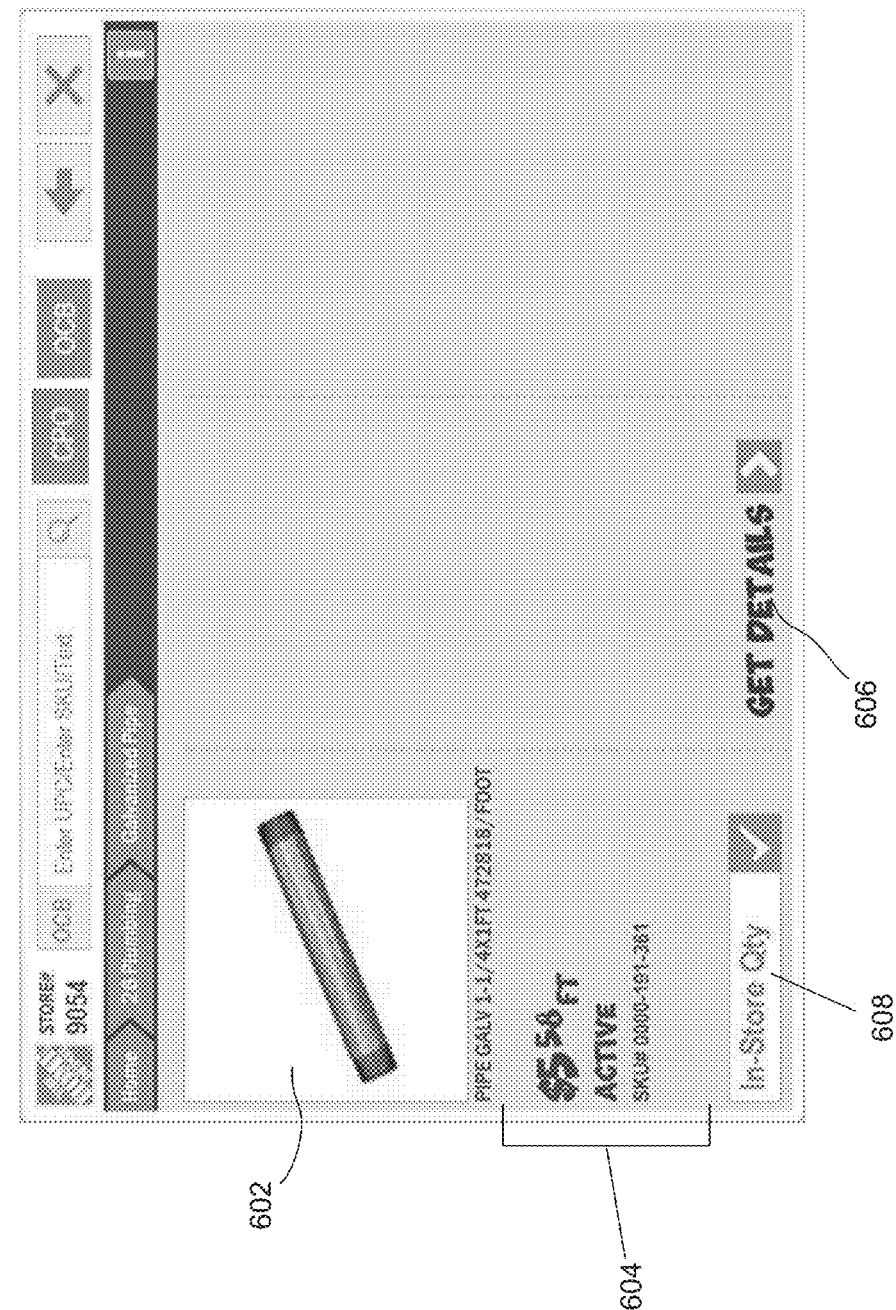
FIG. 6 depicts an item informational interface displayable during an embodiment of the online inventory system.
Figure 7:
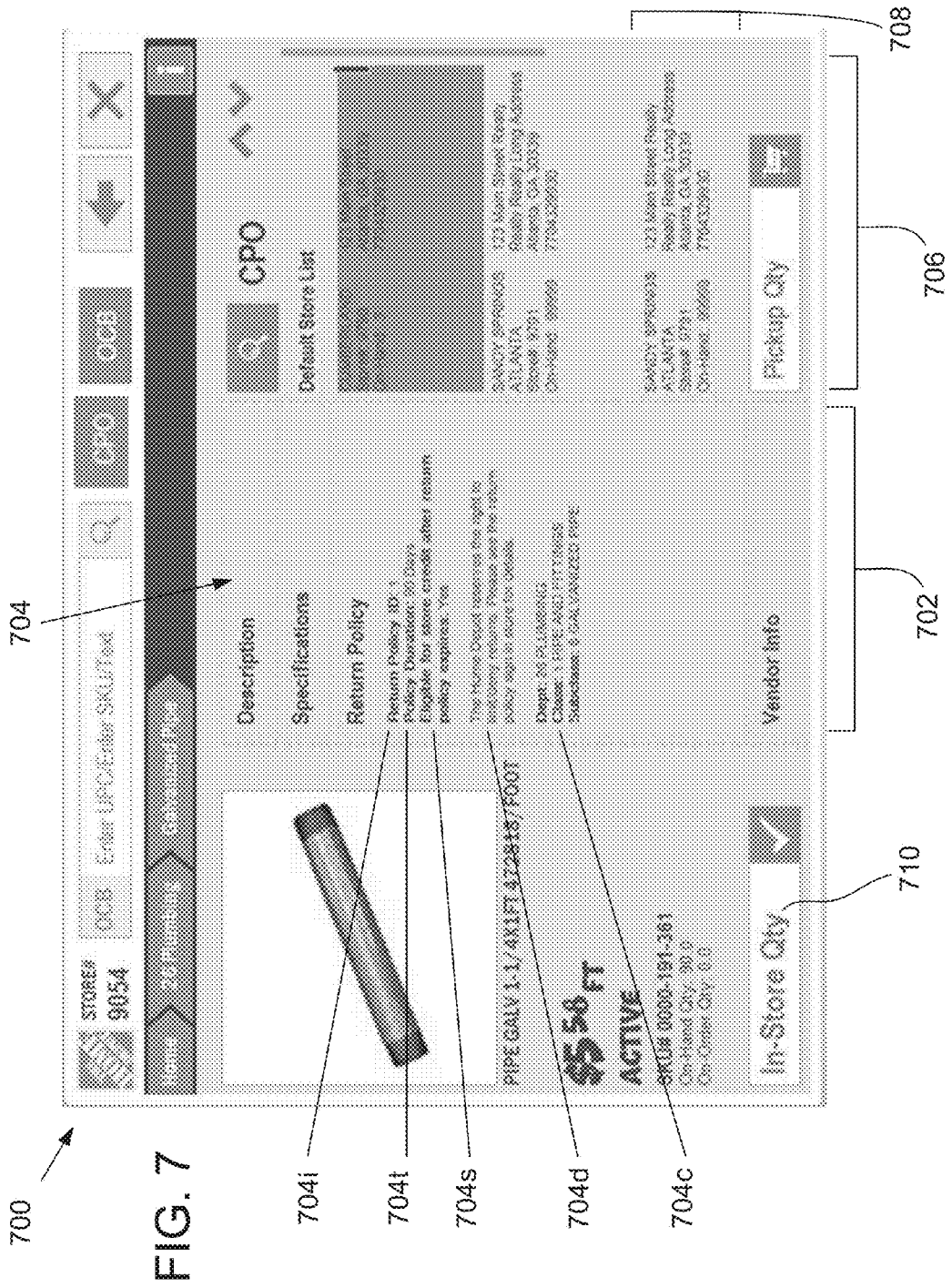
FIG. 7 depicts a detailed item informational interface displayable during an embodiment of the online inventory system.

FIG. 6 shows an item informational interface 600, which is displayed when a user selects an item icon 502 from the menu shown in FIG. 5. In the embodiment shown, item image 602 may be displayed. In addition to item image 602, and as shown in FIG. 6, one or more of the types of item description information described with respect to FIG. 5—such as name 502n, quantity and size information 502qs, SKU designation 502s, and status information 502si—in item information field 604. The functionality triggered by selecting detailed item information icon 606 may display additional detailed item information, as shown in FIG. 7. The functionality triggered by selecting quantity-add field 608 may enable a user to add a quantity of an item to an online shopping cart for a customer to purchase.

FIG. 7 shows a detailed item informational interface 700, which is displayed when a user selects detailed item information icon 606 from the item page shown in FIG. 6. In the embodiment shown, detailed item information is displayed in a detailed item information field 702. Category icons 704 may be provided and are selectable to display detailed item information related to the selected category in detailed item information field 702. Examples of detailed item information associated with a Return Policy category icon, as shown in FIG. 7, include a return policy ID number 704i, a return policy duration time period 704t (e.g., 30 days, 90 days, or the like), a store credit eligibility notation 704s, a return policy description 704d, and item classification information 704c. Although not shown, examples of detailed item information associated with a Specifications category icon include product dimensions; examples of detailed item information associated with a Description category icon include notes on typical item use and item composition materials; and examples of detailed item information associated with a Vendor Info category icon include vendor name and address information.

In the embodiment shown, remote store information field 706 is provided to display a list of remote stores comprising one or more remote store entries 708. Remote store entries 708 may provide information such as store location, address, telephone number, and quantity of on-hand and on-order items available at the corresponding remote store.

The functionality triggered by selecting quantity-add interface 710 may allow a user to order a quantity of items for in-store pickup or remote-store pickup. For example, if multiple remote stores are displayed in remote store information field 706, the functionality triggered by selecting quantity-add interface 710 may enable the user to add items to a customer pickup order cart and select the store in which the customer will pick up the item. In the embodiment shown, remote store information field 706 displays a list of default remote stores. Default remote stores may be the closest stores according to geographic area, such as zip code.

Figure 8:
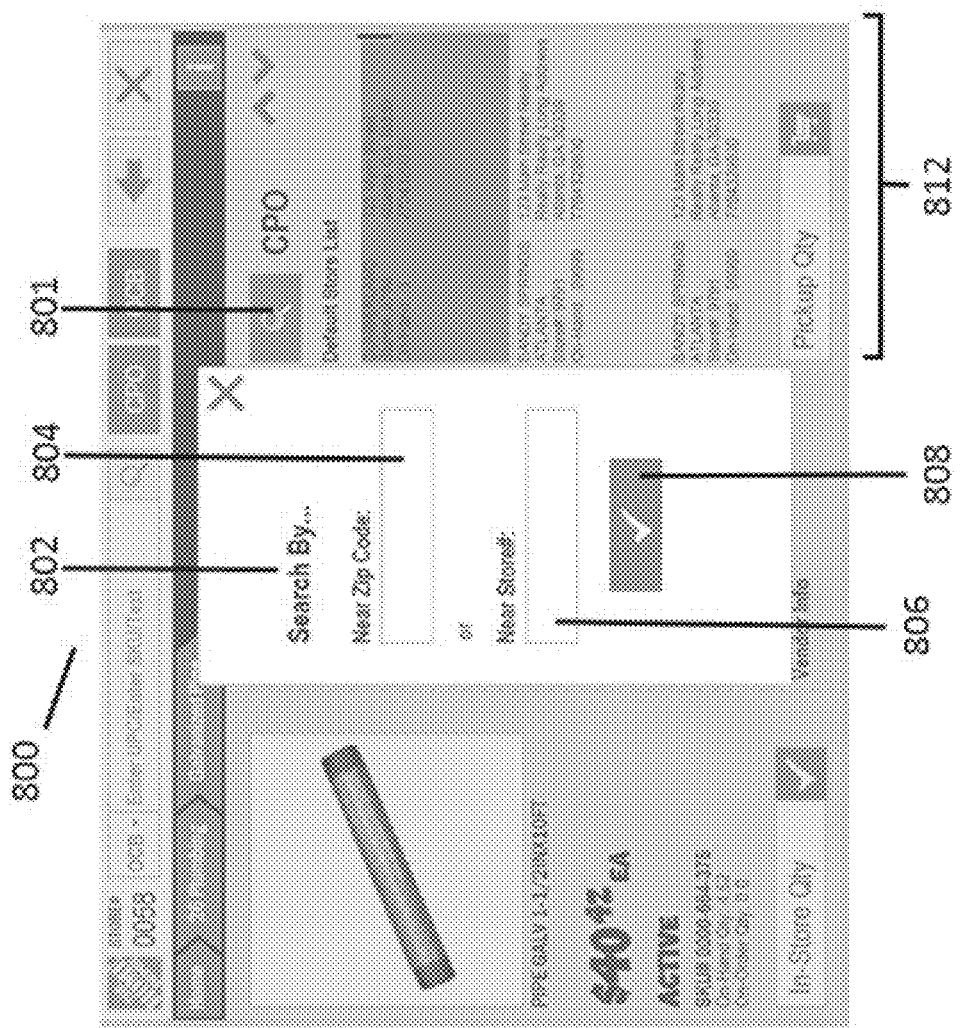
FIG. 8 depicts a remote store search interface displayable during an embodiment of the online inventory system.

FIG. 8 shows a remote store search interface 800, in which a user may search for a group of remote stores after selecting query icon 801. In the embodiment shown, store search box 802, the appearance of which is triggered by a user's selection of query icon 801, contains a zip code search field 804 and a store number search field 806. A user may enter a zip code or store number into the appropriate field. The functionality triggered by subsequently selecting search button 808 may enable the user to obtain applicable search results. Remote store information field 812 may be updated to display the applicable search results.

Figure 9:
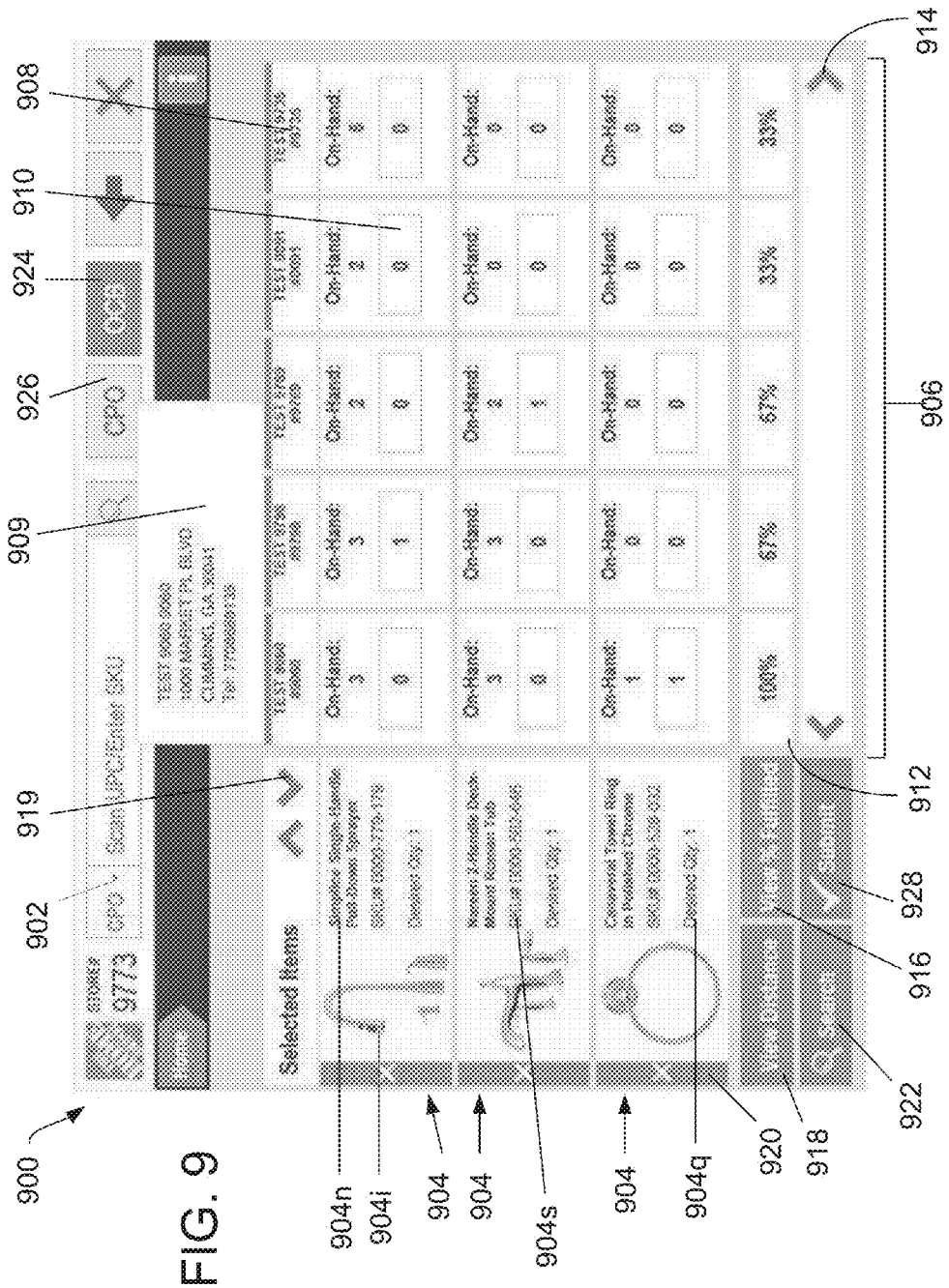
FIG. 9 depicts a customer pickup order store selection interface displayable during an embodiment of the online inventory system.

FIG. 9 shows a customer pickup order store selection interface 900, which may be accessed by selecting pull-down button 902 and selecting a CPO menu option. In the embodiment shown, customer pickup order store selection interface 900 includes a cart interface having item icons 904 corresponding to items selected from the hierarchical menus or product search results described in FIGS. 3A-8. Item icons 904 may include item description information, which may include one or more of a name 904n (e.g., an abbreviated name) for the item, desired quantity information 904q, and stock keeping unit (SKU) designation 904s for the item. Item icons 904 may also include an item image 904i displaying a picture of the item. A user may add items to the cart by scanning the item or entering an item identification number. A user may also select and add one or more pickup stores to the cart interface. The stores may be displayed in remote store information field 906.

In the embodiment shown, remote store information field 906 includes remote store entries 908 (comprising, for example, information about the store, such as store number), store information pop-up window 909 (comprising, for example, additional information about the store, such as store address and store phone number), item availability and quantity fields 910, order percentage/distance entries 912, and store scrolling buttons 914. As shown, remote store information field 906 may be arranged in a grid where each row corresponds to an item and each column corresponds to a remote store. Item availability and quantity fields 910 may show the on-hand quantities (or the on-order quantities) of the particular item at the particular store and may allow the user to enter an item quantity for in-store purchase and remote-store pickup. Therefore, the user can facilitate a customer making in-store purchases from multiple remote stores. For example, if an item search yields three copper fittings and the customer wants all three fittings, the user can utilize customer pickup order store selection interface 900 to facilitate pickup of the first fitting from a first store, pickup of the second fitting from a second store, and pickup of the third fitting from a third store. Store information pop-up window 909 may be opened by hovering a mouse arrow over a particular store entry 908.

Order percentage/distance entries 912 may show a percentage of an order that may be fulfilled at a particular remote store or may show distance information for a particular remote store in relation to the present store. In the embodiment shown, View Percentage button 916 and View Distance button 918 are provided. The functionality triggered by selecting View Percentage button 916 may allow the user to view order percentage entries 912 and the functionality triggered by selecting View Distance button may allow the user to view distance entries 912 (not shown), In the embodiment shown, when the user selects View Percentage button 916, stores having a higher percentage of order fulfillment are listed first. For example, in the embodiment shown, the first, second, and third stores have all three of the three items contained in the cart in-stock and available. Therefore, the first, second, and third stores listed can complete 100% of the desired order. Conversely, the fourth store can complete 67%, or two-thirds, of the desired order and the fifth store can only complete 33%, or one-third, of the desired order because that store only has one of the three desired items in-stock and available. Similarly, when the user selects View Distance button 918, the user may view distance information for each of the stores that can fulfill a part of the order. In some embodiments, the remote stores may be ordered to have the closest store listed first. Alternatively, the stores may remain ordered where the stores having a higher percentage of order fulfillment are listed first. By toggling between View Percentage button 916 and View Distance button 918, the user may determine the closest remote store that can fulfill the largest percentage of the desired order. The functionality triggered by selecting store scrolling buttons 914 may enable a user to navigate remote store entries 908, item availability and quantity fields 910, and order percentage/distance entries 912.

In the embodiment shown, the functionality triggered by selecting item scrolling buttons 919 may enable the user to navigate item icons 904. The functionality triggered by selecting item delete buttons 920 may allow the user to remove items from the cart. The functionality triggered by selecting search button 922 may enable the user to search for remote stores and the functionality triggered by selecting item inventory button 924 may enable the user to return to the item inventory interfaces shown in FIGS. 3A-8. The functionality triggered by selecting customer pickup order button 926 may enable the user to return to customer pickup order store selection interface 900. Once all desired items and quantities have been entered, the functionality triggered by selecting the submit button 928 may enable the user to finalize the order.

Figure 10:
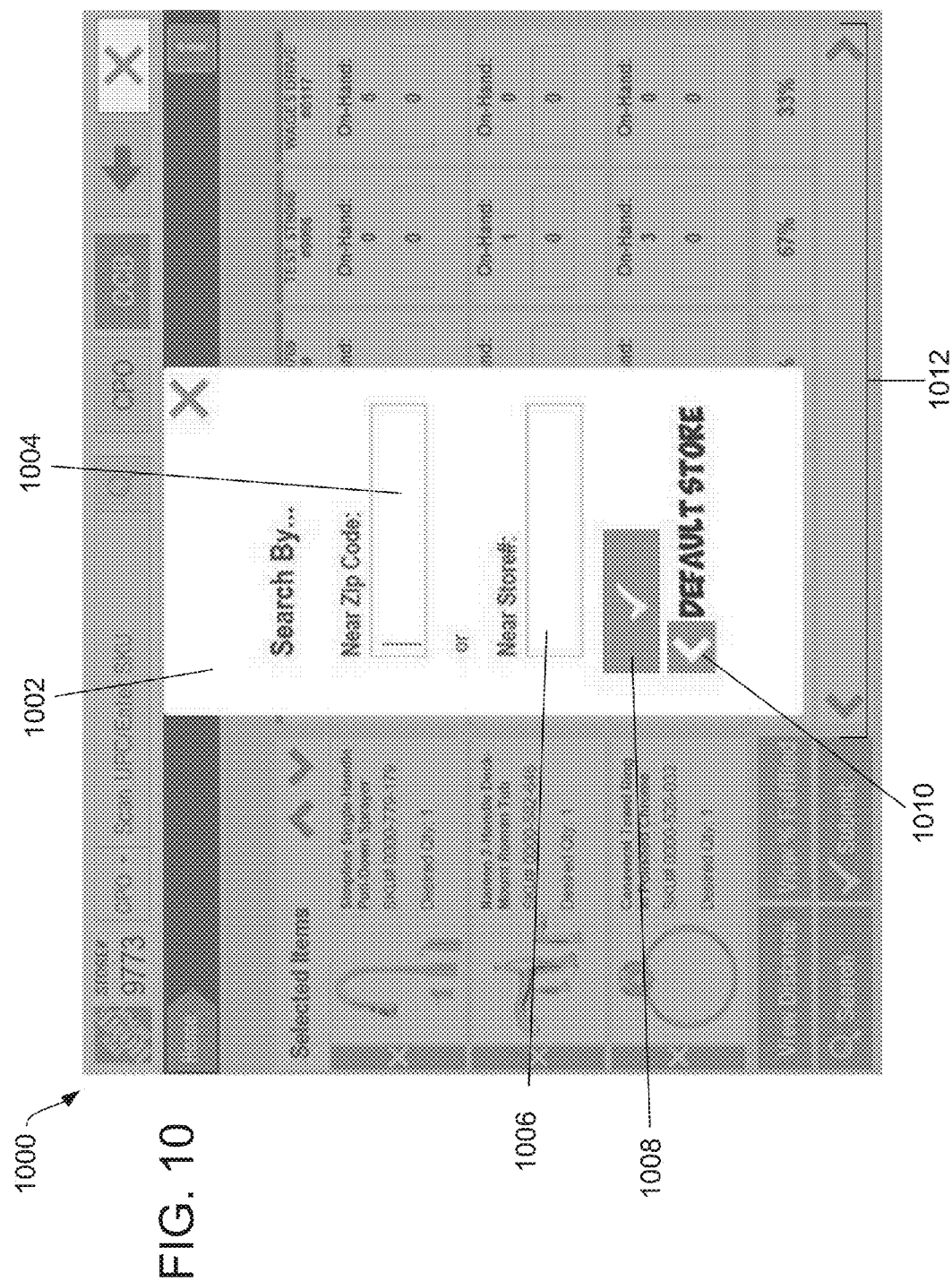
FIG. 10 depicts a customer pickup order remote store search interface displayable during an embodiment of the online inventory system.

FIG. 10 shows a customer pickup order remote store search interface 1000, in which a user may search for a group of remote stores. The embodiment shown may be displayed, for example, when a user selects search button 922 in FIG. 9 to search for remote stores. Store search box 1002 contains a zip code search field 1004 and a store number search field 1006. A user may enter a zip code or store number into the appropriate field. The functionality triggered by subsequently selecting search button 1008 may enable the user to obtain applicable search results. Remote store information field 1012 may be updated to display the applicable search results. The functionality triggered by selecting default store return button 1010 may enable a user to return to the default remote store list displayed in FIG. 7.

Figure 11:
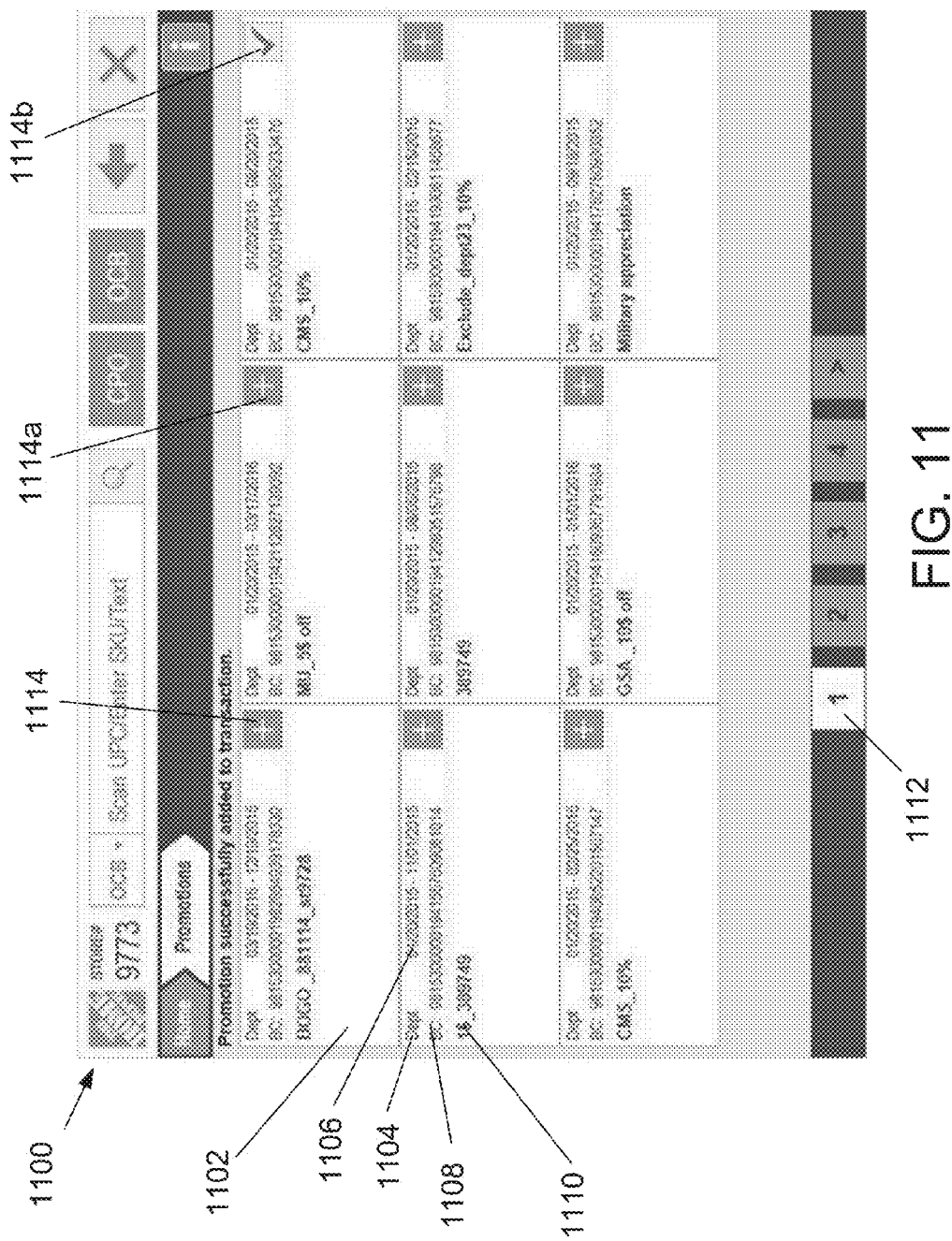
FIG. 11 depicts a promotion interface displayable during an embodiment of the online inventory system.

FIG. 11 shows a promotion selection interface 1100, in which a user may select one or more applicable promotions or coupons to add to the order. The embodiment shown may be displayed, for example, when a user selects a promotions icon from the menu displayed in FIG. 3A or when a user selects promotions list 1210 in FIG. 12 discussed below. In the embodiment shown, promotion selection interface 1100 comprises one or more promotion icons 1102. Promotion icons may contain various information fields, such as applicable department 1104, promotion validity dates 1106, promotion bar code or identification number 1108, and promotion description 1110.

In the embodiment shown, promotion selection interface 1100 includes scroll buttons 1112 and selection boxes 1114 for each promotion icon 1102. Scroll buttons 1112 may allow the user to toggle between multiple pages of promotion icons 1102. Promotion icons 1102 may be sorted by department, description, or other suitable category. The functionality triggered by selecting selection boxes 1114 allow the user to add or delete one or more applicable promotions or coupons to an order. The user may select a selection box 1114 having a plus sign 1114*a* to add a promotion to the order. Once a promotion has been added to the order, the selection box 1114 for that promotion will display a check 1114*b* to inform the user that the promotion is selected. The user may uncheck a selection box 1114 having a check 1114*b* to delete the promotion from the order. In some embodiments, the user can add or delete promotions from the order at any time before the final order is submitted.

Figure 12:
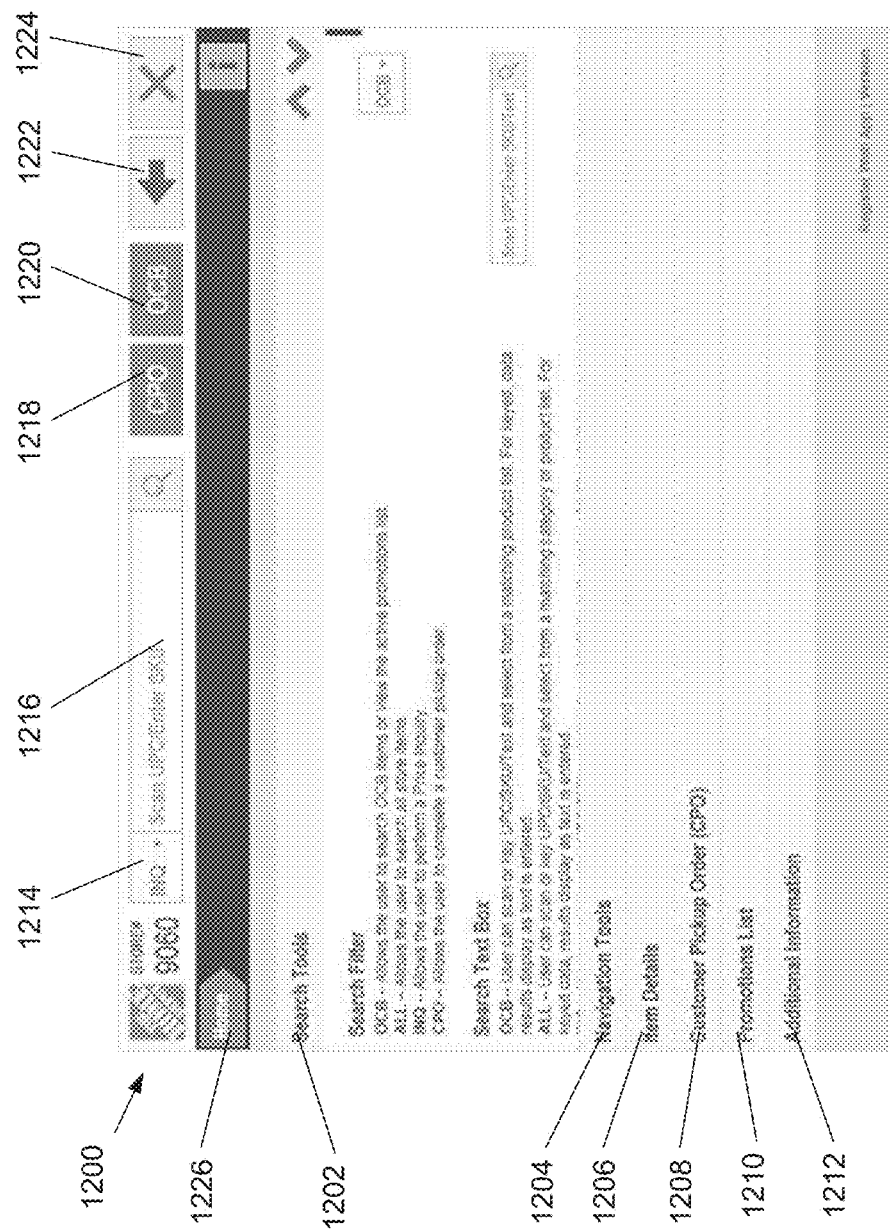
FIG. 12 depicts a price inquiry interface (INQ) displayable during an embodiment of the online inventory system.

FIG. 12 shows a price inquiry interface (INQ) 1200. Price inquiry interface 1200 may be displayed when a user selects choice INQ from dropdown menu 1214. Price inquiry interface 1200 may comprise selectable options, including search tools 1202, navigation tools 1204, item details 1206, customer pickup order 1208, promotions list 1210, and additional information 1212. The functionality triggered by a user selection of search tools 1202 may allow price inquiry interface 1200 to display search instruction information. For example, the search instructions may contain information on how to use search filter dropdown menu 1214 and/or search text box 1216. The functionality triggered by a user selection of navigation tools 1204 may allow price inquiry interface 1200 to display navigation instruction information. For example, the navigation instructions may contain information on how to use CPO button 1218 and OCB button 1220 to navigate to the customer pickup order and online cashier book interfaces, respectively. Additionally, the navigation instructions may contain information on how to use Back button 1222, Cancel button 1224, and breadcrumbs button(s) 1226.

The functionality triggered by a user selection of item details 1206 may allow the user to be displayed information similar to that shown in FIG. 7 for an item that is scanned or searched for in search text box 1216. The functionality triggered by a user selection of customer pickup order 1208 may allow the user to be displayed information similar to that shown in FIG. 9 for items contained in a customer's order. The functionality triggered by a user selection of promotions list 1210 may allow a user to access a list of promotions to apply to the order similar to that shown in FIG. 11. The functionality triggered by a user selection of additional information 1212 may allow a user to access a variety of other information such as a quick reference guide and other resources.

Figure 13A:
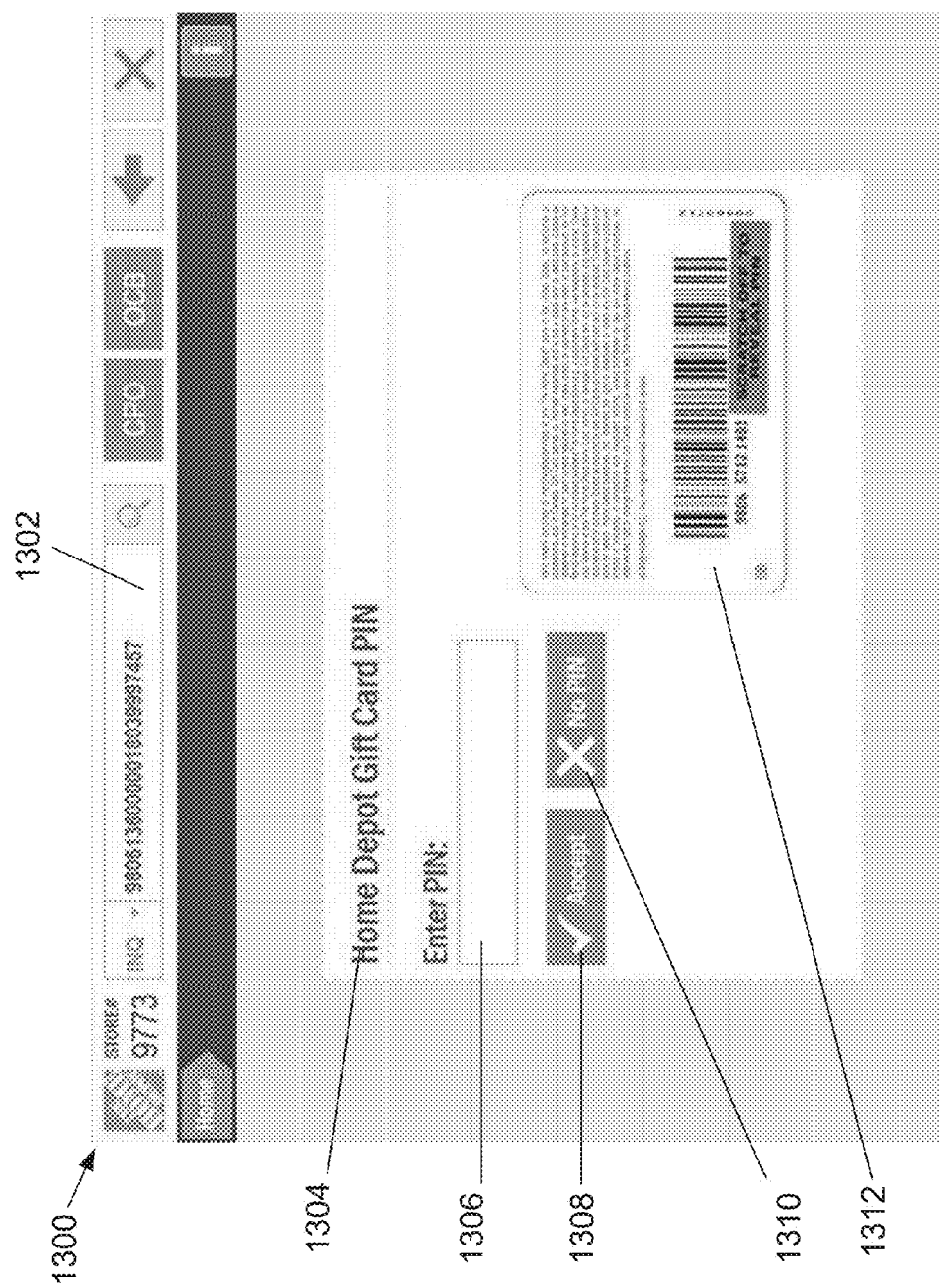
FIG. 13A depicts a PIN entry screen of a gift card interface displayable during an embodiment of the online inventory system.

FIGS. 13A-13D show a gift card/store credit payment interface 1300. A user may access the various screens of gift card/store credit payment interface 1300 by scanning a gift card or entering gift card or store credit information in search text box 1216 of price inquiry interface 1200 in FIG. 12. After an order is compiled, a customer may use a gift card or store credit to pay for the order instead of cash, check, or credit card. The functionalities shown in FIGS. 13A-13D may be applied to both gift cards and store credit. FIG. 13A shows a first screen of gift card/store credit payment interface 1300. If a customer desires to pay for an order using a gift card, the user may scan the customer's gift card, which will automatically display a gift card image 1312 and populate search field 1302 with a gift card code number. Alternatively, the user may manually enter a gift card code number into search field 1302 to find the gift card and display the gift card image 1312.

In the embodiment shown, card/store credit payment interface 1300 includes a type field 1304, a PIN entry field 1306, an Accept button 1308, and a No PIN button 1310. Type field 1304 may inform the user of the type of transaction being performed (i.e., gift card or store credit). After a gift card is found by either scanning the gift card or manually entering gift card identification information into search field 1302, the user may enter a gift card PIN number into PIN entry field 1306. In the embodiment shown, the gift card PIN may be displayed on the gift card image 1312. Upon entry of the gift card PIN number into PIN entry field 1306, the functionality triggered by selecting the Accept button 1308 may allow the user to authenticate the gift card. In some embodiments, the gift card may not have a PIN number or the PIN number may be inaccessible. The functionality triggered by selecting the No PIN button 1310 may allow the user to authenticate the gift card using other information.

Figure 13B:
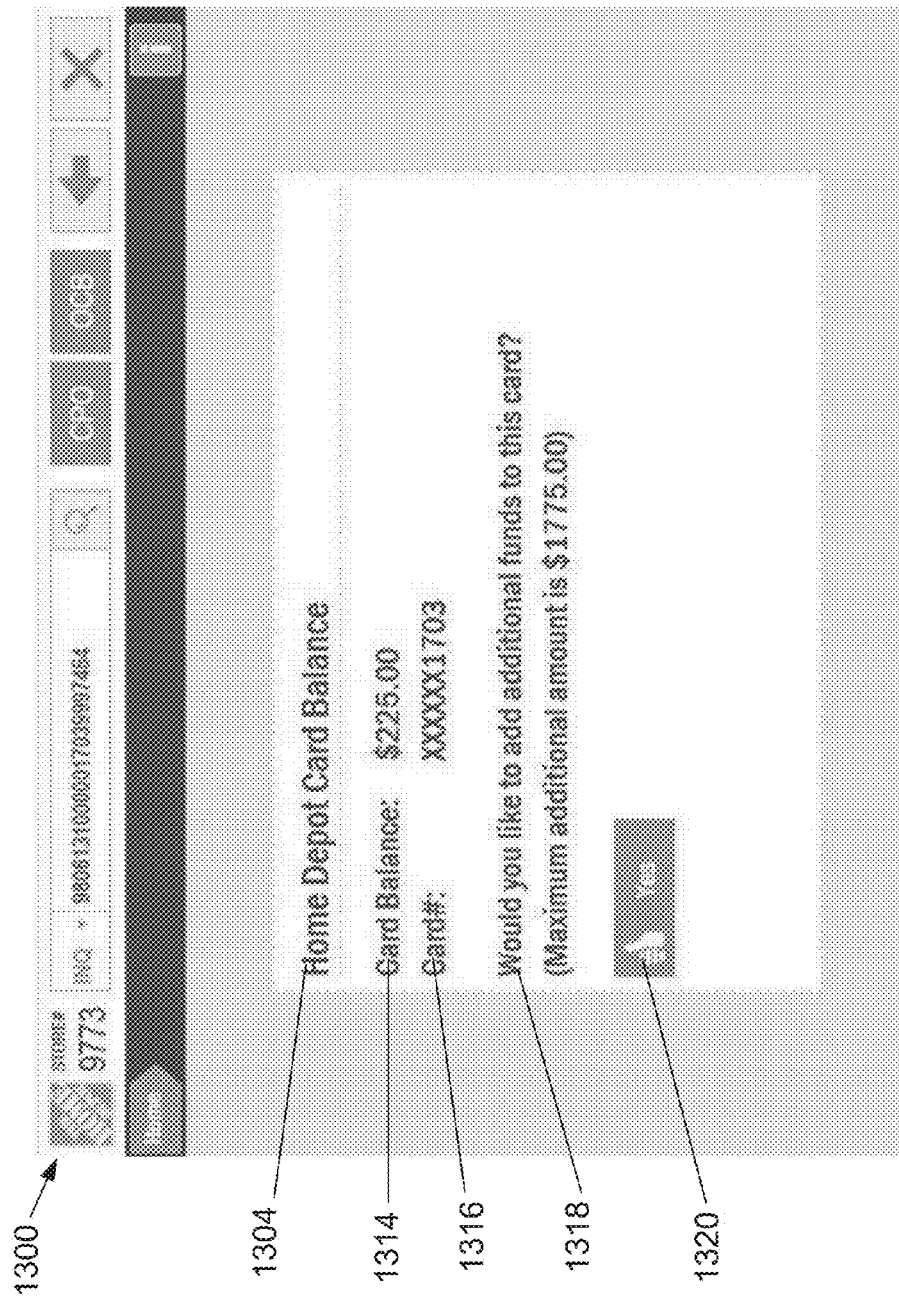
FIG. 13B depicts an add funds screen of a gift card interface for a gift card with an existing balance displayable during an embodiment of the online inventory system.

FIG. 13B shows a second screen of gift card/store credit payment interface 1300 that includes type field 1304, a card balance field 1314, a card identification number field 1316, a question field 1318, and a Yes button 1320 may be displayed after the user authenticates a gift card. In the embodiment shown, type field 1304 informs the user that the gift card has been authenticated and that a card balance is displayed. The gift card balance may be displayed in card balance field 1314 and the gift card identification number may be displayed in card identification number field 1316. In the embodiment shown, the gift card identification number is masked except for the last four digits for security purposes. In the embodiment shown, the user has the option to add additional funds to the gift card up to a maximum amount. One reason a customer may choose to do this may be to limit multiple payment transactions for a single order. If the user desires, the functionality triggered by selecting Yes button 1320 may allow the user to enter an additional amount to be added to the gift card balance. Upon entry of the additional funds, card balance field 1314 may be updated to reflect the updated balance. If the user does not wish to add funds, the user may apply the card balance to the order.

Figure 13C:
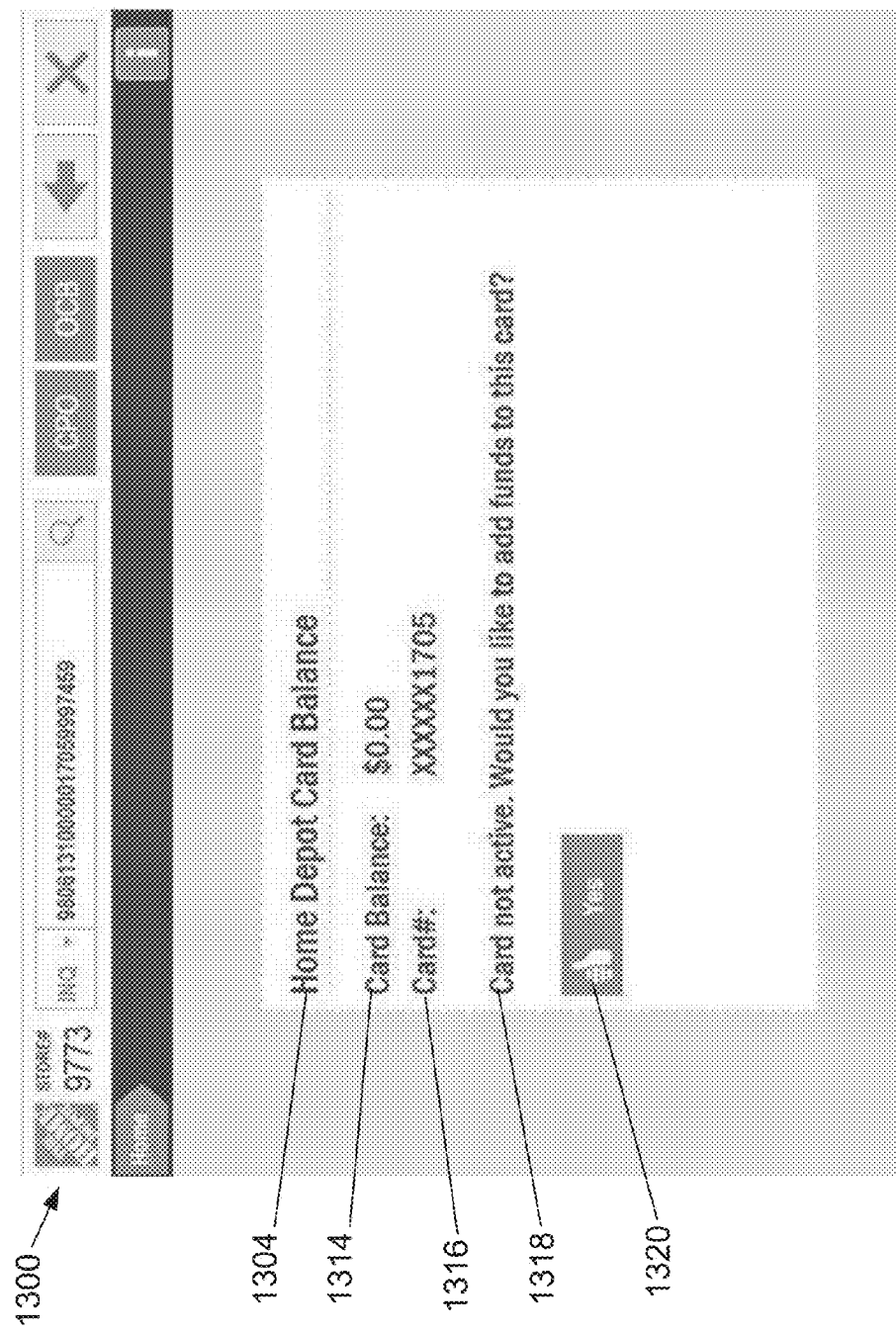
FIG. 13C depicts an add funds screen of a gift card interface for a gift card with no balance displayable during an embodiment of the online inventory system.

FIG. 13C shows a third screen of gift card/store credit payment interface 1300 that includes type field 1204, card balance field 1314, card identification number field 1316, question field 1318, and a YES button 1320 may be displayed for a new gift card or a gift card that has no balance. In the embodiment shown, card balance field 1314 informs the user that the card has no funds and question field 1318 asks the user whether he wishes to add funds to the gift card. If the user desires, the functionality triggered by selecting Yes button 1320 may allow the user to enter an amount to be added to the gift card balance.

Figure 13D:
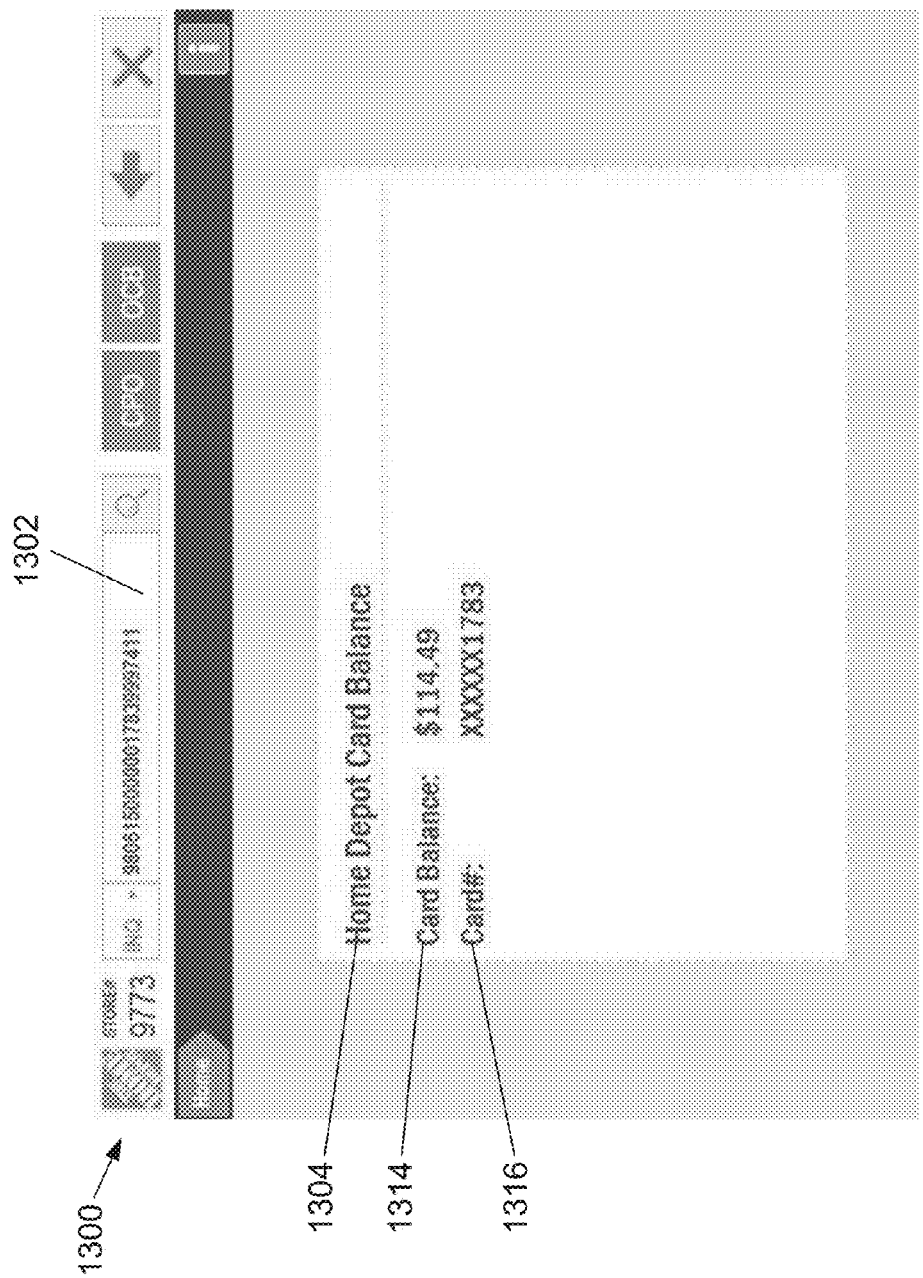
FIG. 13D depicts a funds balance screen of a store credit interface displayable during an embodiment of the online inventory system.

FIG. 13D shows a fourth screen of the gift card/store credit payment interface 1300 that includes search field 1302, type field 1304, card balance field 1314, and store credit identification number field 1316. In the embodiment shown, this screen is displayed when a user scans a store credit card or manually enters a store credit code number into search field 1302. In the embodiment shown, card balance field 1314 informs the user of the store credit balance and store credit identification number field 1316 informs the user of the store credit identification number. The user may then apply the store credit balance to the order.

Figure 14A:
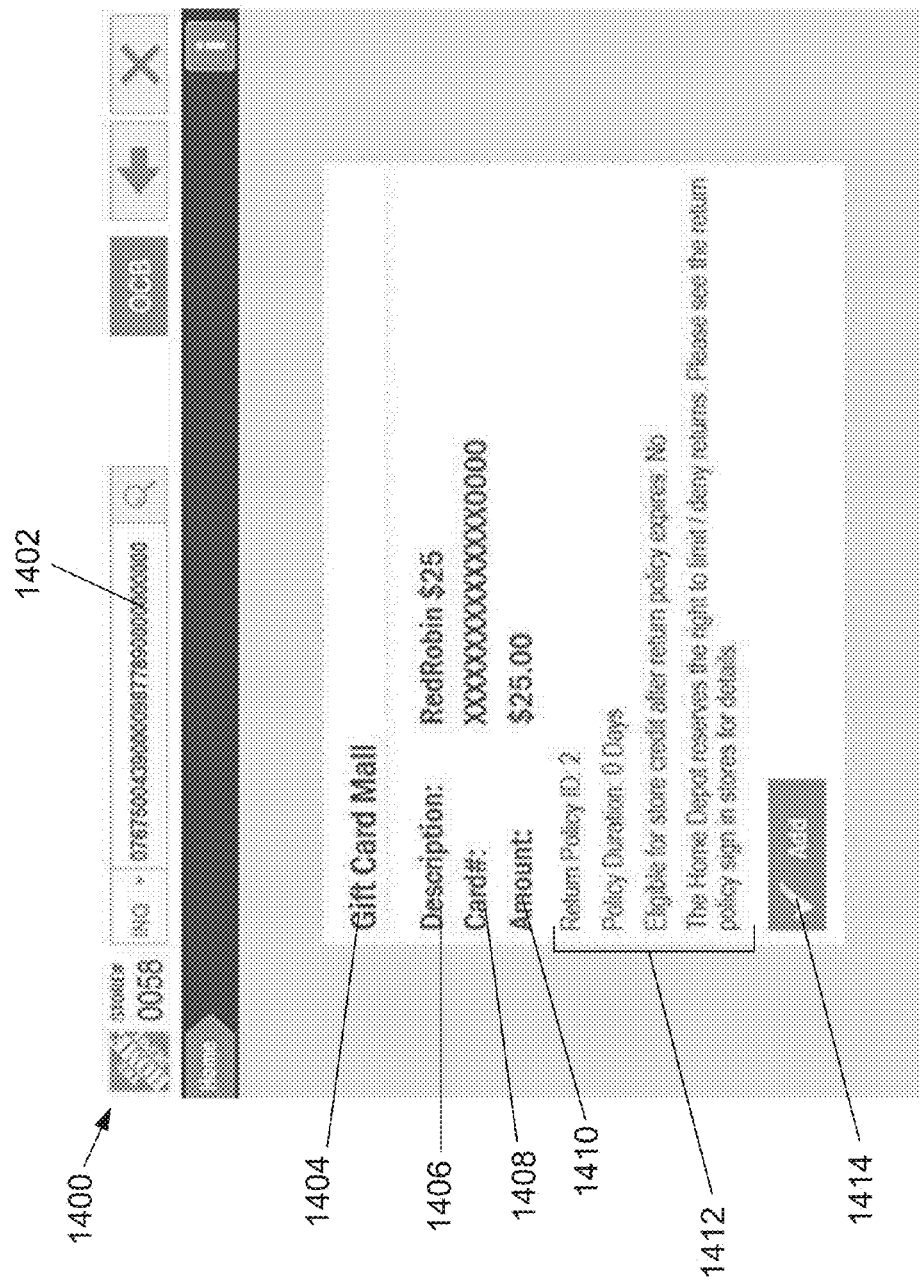
FIG. 14A depicts a gift card information screen of a gift card mall interface displayable during an embodiment of the online inventory system.
Figure 14B:
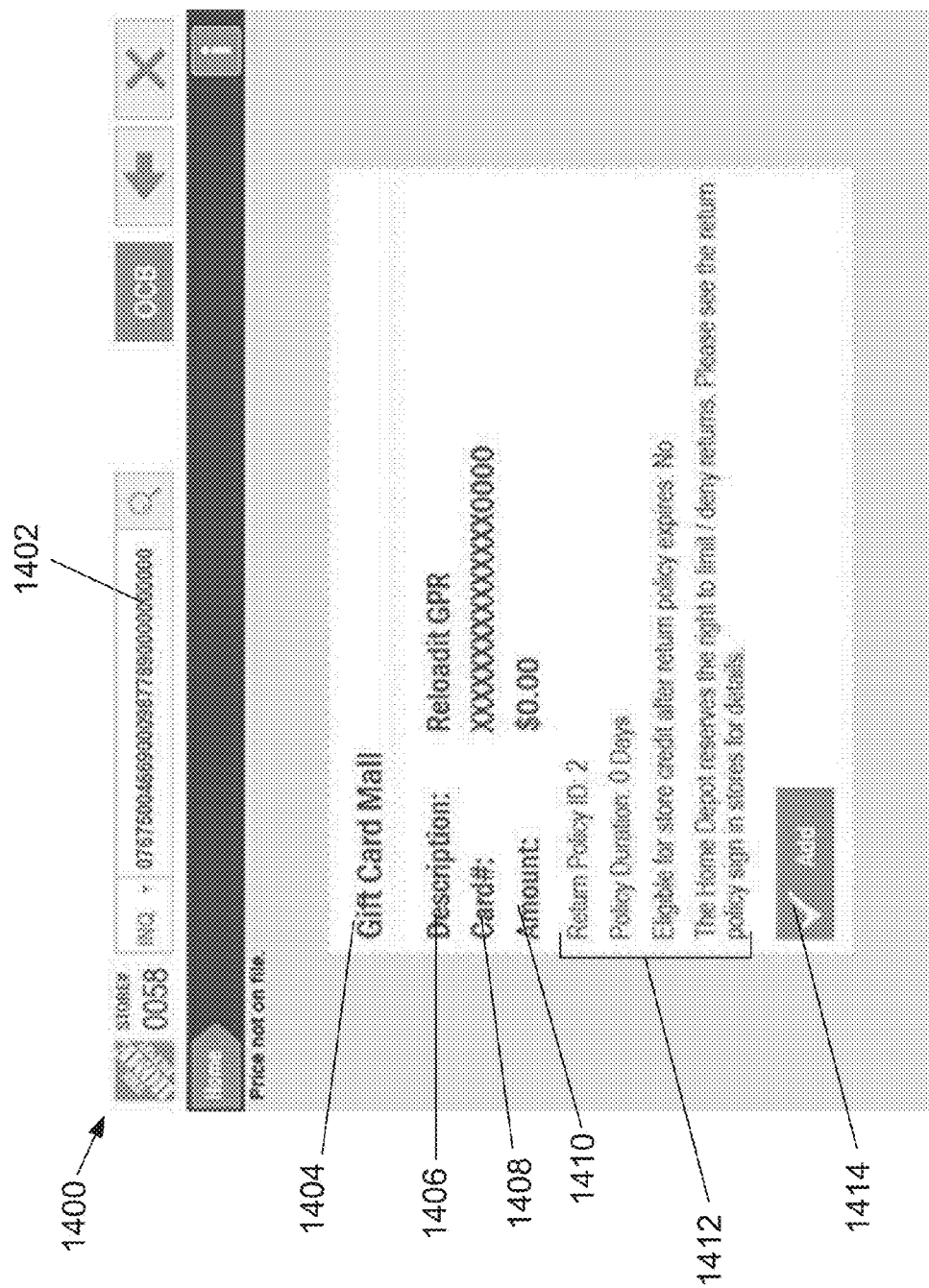
FIG. 14B depicts a general purpose reloadable card information screen of a gift card mall interface displayable during an embodiment of the online inventory system.

FIGS. 14A-14B show various screens of a gift card mall interface 1400. In some embodiments, a user may access the various screens of gift card mall interface 1400 by scanning a gift card or entering gift card information in search text box 1216 of price inquiry interface 1200 in FIG. 12. This may allow the user to view the price of a Gift Card Mall (GCM) item. In some embodiments, a GCM item may be a third party gift card or other third party item for sale, such as a prepaid wireless phone. In some embodiments, the user may add the GCM item to the order and/or add funds to a reloadable gift card if the user is in the process of compiling a sale order for a customer.

FIG. 14A shows a gift card information screen of a gift card mall interface 1400 that includes type field 1404, card description field 1406, card number field 1408, card balance field 1410, card information field 1412, and an Add button 1414. In some embodiments, the user may access the gift card information screen of FIG. 14A by scanning a gift card or entering gift card information in search text box 1402. This embodiment may be displayed when the user accesses a GCM item having a predefined balance. In the embodiment shown, type field 1404 informs the user that a GCM item has been selected. A description and card number of the GCM item may be displayed in card description field 1406 and card number field 1408, respectively. In the embodiment shown, the card number displayed in card number field 1408 is the same as the card number displayed in search text box 1402 but masked except for the last four digits for security purposes. The predefined gift card balance may be displayed in card balance field 1410. Card information, terms, and conditions may be displayed in card information field 1412. If the user desires, the functionality triggered by selecting Add button 1414 may allow the user to add the GCM item to an existing order.

FIG. 14B shows a general purpose reloadable card information screen of a gift card mall interface 1400 that includes type field 1404, card description field 1406, card number field 1408, card balance field 1410, card information field 1412, and an Add button 1414. In some embodiments, the user may access the general purpose reloadable card information screen of FIG. 14B by scanning a gift card or entering gift card information in search text box 1402. This embodiment may be displayed when the user accesses a GCM item having a reloadable funding option. In the embodiment shown, type field 1404 informs the user that a GCM item has been selected. A description and card number of the GCM item may be displayed in card description field 1406 and card number field 1408, respectively. In the embodiment shown, the card number displayed in card number field 1408 is the same as the card number displayed in search text box 1402 but masked except for the last four digits for security purposes. In the embodiment shown, the reloadable gift card has a default balance of $0.00, which is displayed in card balance field 1410. Card information, terms, and conditions may be displayed in card information field 1412. The functionality triggered by selecting Add button 1414 may allow the user to enter an amount to be added to the balance of the reloadable gift card and add the GCM item to an existing order. In some embodiments, the reloadable gift card may have threshold minimum and/or maximum balance amounts that may be enforced to govern the user's addition of funds to the card.

If implemented in firmware and/or software, the functions described above may be stored as one or more instructions or code on a non-transitory computer-readable medium. Examples include non-transitory computer-readable media encoded with a data structure and non-transitory computer-readable media encoded with a computer program. Non-transitory computer-readable media includes physical computer storage media. A physical storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other physical medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above are also included within the scope of non-transitory computer-readable media. Moreover, the functions described above may be achieved through dedicated devices rather than software, such as a hardware circuit comprising custom VLSI circuits or gate arrays, off-the-shelf semiconductors such as logic chips, transistors, or other discrete components, all of which are non-transitory. Additional examples include programmable hardware devices such as field programmable gate arrays, programmable array logic, programmable logic devices or the like, all of which are non-transitory. Still further examples include application specific integrated circuits (ASIC) or very large scale integrated (VLSI) circuits. In fact, persons of ordinary skill in the art may utilize any number of suitable structures capable of executing logical operations according to the described embodiments.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the disclosed methods, devices, and systems are not intended to be limited to the particular forms disclosed. Rather, they include all modifications and alternatives falling within the scope of the claims, and embodiments other than those shown may include some or all of the features of the depicted embodiment. For example, components may be combined as a unitary structure and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A method for implementing an online inventory application, the method comprising:
   providing a store interface running or stored on a hardware device comprising at least one processor, the store interface configured to access item information from a current store and a plurality of remote stores;
   determining an inventory quantity for an item related to the item page at two or more of the remote stores;
   receiving an input of a respective remote quantity of an item related to the item page for purchase through the user interface from each of the two or more remote stores; and
   completing a single purchase transaction of the item for a customer through the user interface, the single purchase transaction comprising:
   designating the respective remote quantities of the item for pickup at the two or more remote stores.

2. The method of claim 1, where the completing the purchase transaction comprises designating a respective quantity of the item for pickup at the current store.

3. The method of claim 1, further comprising conducting a search of the remote stores.

4. The method of claim 3, where the search comprises one or more of a zip code search and a store number search.

5. The method of claim 1, where completing the purchase transaction comprises applying a gift card balance to a purchase of the item.

6. The method of claim 1, where completing the purchase transaction comprises applying a store credit balance to a purchase of the item.

7. The method of claim 1, where completing the purchase transaction comprises adding one or more third party items to an order for the customer.

8. A non-transitory computer readable medium storing a program comprising instructions executable by a machine to:
   provide a store interface running or stored on a hardware device comprising at least one processor, the store interface configured to access item information from a current store and a plurality of remote stores;
   determine an inventory quantity for an item related to the item page at two or more of the remote stores;
   receive an input of a respective remote quantity of an item related to the item page for purchase through the user interface from each of the two or more remote stores; and
   complete a single purchase transaction of the item for a customer through the user interface, the single purchase transaction comprising:

designating the respective remote quantities of the item for pickup at the two or more remote stores.

9. The non-transitory computer readable medium of claim 8, wherein completing the purchase transaction comprises designating a respective quantity of the item for pickup at the current store.

10. The non-transitory computer readable medium of claim 8, wherein the instructions are further executable by a machine to conduct a search of the remote stores.

11. The non-transitory computer readable medium of claim 10, where the search comprises one or more of a zip code search and a store number search.

12. The non-transitory computer readable medium of claim 8, wherein completing the purchase transaction comprises applying a gift card balance to a purchase of the item.

13. The non-transitory computer readable medium of claim 8, wherein completing the purchase transaction comprises applying a store credit balance to a purchase of the item.

14. The non-transitory computer readable medium of claim 8, wherein completing the purchase transaction comprises adding one or more third party items to an order for the customer.

15. A computing device for implementing an online inventory application, the computing device comprising:

at least one processor;

a memory device; and a display device configured to display a graphical user interface (GUI) comprising one or more graphical elements configured to implement, using the at least one processor, one or more software applications stored on one or more servers, the software applications configured to:

provide a store interface, the store interface configured to access item information from a current store and a plurality of remote stores;

determine an inventory quantity for an item related to the item page at two or more of the remote stores;

receive an input of a respective remote quantity of an item related to the item page for purchase from each of the two or more remote stores en through the user interface; and complete a single purchase transaction of the item for a customer on the user interface, the single purchase transaction comprising:

designating the respective remote quantities of the item for pickup at the two or more remote stores.

* * * * *